(12) United States Patent  (10) Patent No.: US 9,398,075 B2
Ogura  (45) Date of Patent: Jul. 19, 2016

(54) COMMUNICATION SYSTEM, COMMUNICATION APPARATUS, COMMUNICATION METHOD, AND STORAGE MEDIUM

(71) Applicant: FUJITSU LIMITED, Kawasaki-shi, Kanagawa (JP)

(72) Inventor: Takao Ogura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 425 days.

(21) Appl. No.: 14/024,667

(22) Filed: Sep. 12, 2013

(65) Prior Publication Data

US 2014/0082138 A1  Mar. 20, 2014

(30) Foreign Application Priority Data

Sep. 14, 2012 (JP) .................. 2012-202526

(51) Int. Cl.
*G06F 15/16* (2006.01)
*G06F 7/04* (2006.01)
*H04L 29/08* (2006.01)
*H04L 29/06* (2006.01)
*G06F 21/62* (2013.01)

(52) U.S. Cl.
CPC ............ *H04L 67/10* (2013.01); *H04L 63/0407* (2013.01); *H04L 67/1097* (2013.01); *G06F 21/6254* (2013.01)

(58) Field of Classification Search
CPC . H04L 63/10; H04L 63/0281; H04L 63/0407; H04L 63/0414; H04L 63/0428; G06F 17/30867; G06F 21/6254
USPC ................. 709/206, 219, 224–225, 229, 217; 726/27, 28, 29
See application file for complete search history.

(56) References Cited

U.S. PATENT DOCUMENTS

| 6,571,279 | B1 * | 5/2003 | Herz .................. G06F 17/30867 707/999.01 |
| 7,069,319 | B2 * | 6/2006 | Zellner ............... H04L 63/0281 709/219 |
| 8,224,979 | B2 * | 7/2012 | Herz ................... G06F 21/6254 709/206 |
| 8,272,062 | B2 * | 9/2012 | Miki ....................... H04L 63/10 726/26 |
| 2006/0282662 | A1 * | 12/2006 | Whitcomb .............. G06F 21/33 713/156 |
| 2010/0050274 | A1 * | 2/2010 | Miki ....................... H04L 63/10 726/29 |

FOREIGN PATENT DOCUMENTS

JP  2008-42819  2/2008
JP  2011-145754  7/2011

* cited by examiner

*Primary Examiner* — Viet Vu
*Assistant Examiner* — Michael A Chambers
(74) *Attorney, Agent, or Firm* — Fujitsu Patent Center

(57) ABSTRACT

The data server stores, data and user identification information, and transmits to the analysis server the data and first identification information associated with the user identification information. The analysis server analyzes the data and stores an analysis result in association with the first identification information. When the communication apparatus transmits the analysis-result obtainment request to the analysis server, the analysis server transmits, to the communication apparatus, second identification information associated with the analysis-result obtainment request. The communication apparatus transmits the second identification information and the user identification information to the data server. The data server transmits the second identification information and the first identification information associated with the user identification information to the analysis server. The analysis server transmits the analysis result and the second identification information to the communication apparatus. The communication apparatus transmits the analysis result to a requestor that has made the analysis-result obtainment request.

7 Claims, 29 Drawing Sheets

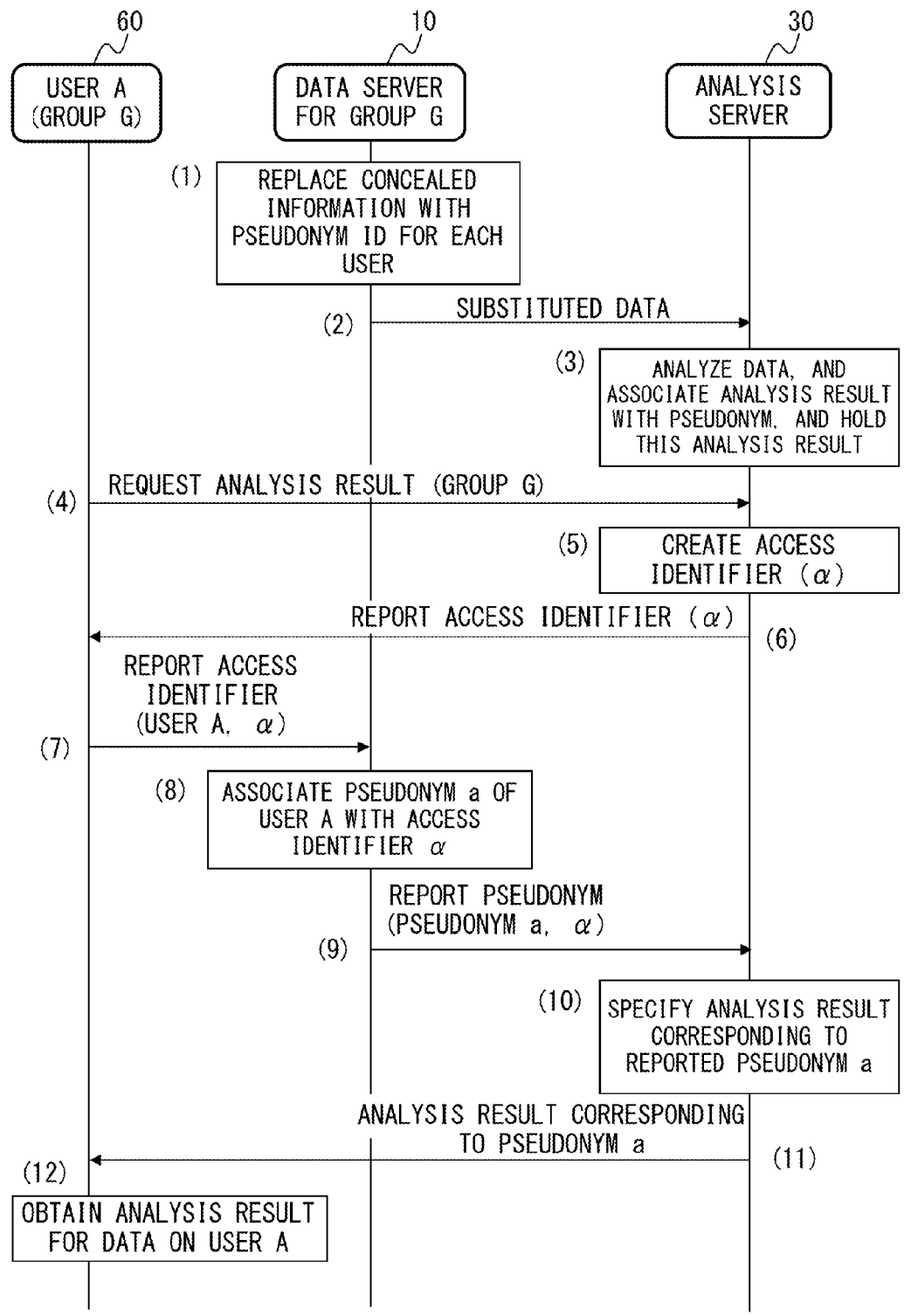
F I G. 1

| STUDENT ID | PSEUDONYM ID |
|---|---|
| 980612 | 123456 |
| ...... | ...... |

F I G. 4

| GROUP ACCOUNT | ACCESS DESTINATION |
|---|---|
| d001 | abc.ed.jp |
| ...... | ...... |

F I G. 6

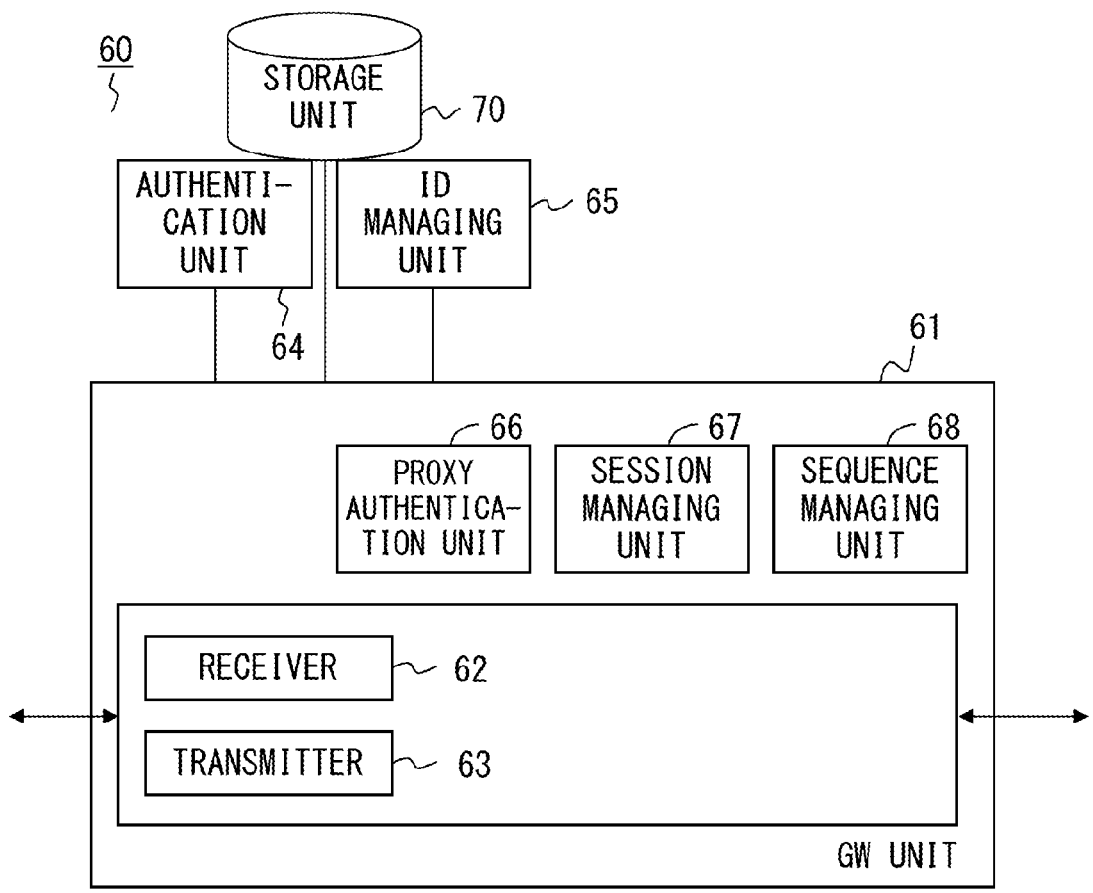
F I G. 7

| USER ID | ACCESS DESTINATION | ACCOUNT (ID/PW) |
|---|---|---|
| hanako | https://kaisekiservice1.com | d0001/pw001 |
| hanako | https://abc.ed.jp | 980612/pwxxx |
| ...... | ...... | ...... |

F I G. 8

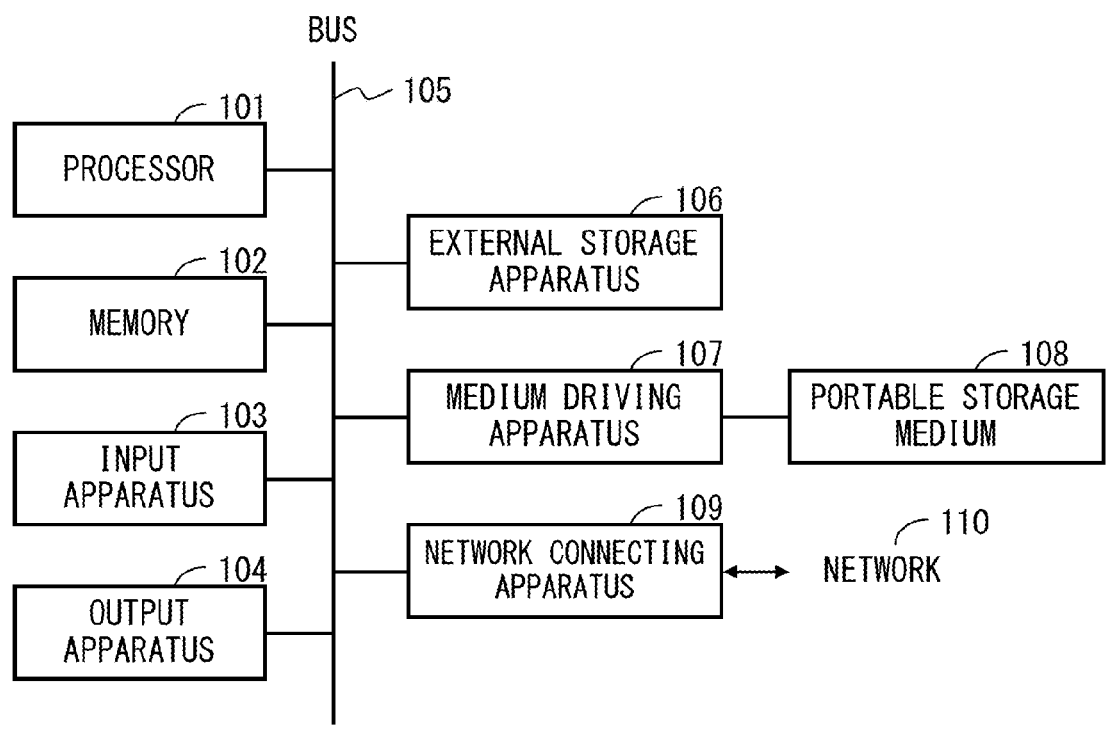
F I G. 10

| STUDENT ID | 980612 |
|---|---|
| NAME | HANAKO SUZUKI |
| ENGLISH | 85 |
| JAPANESE | 70 |
| MATHEMATICS | 100 |
| SOCIAL STUDIES | 20 |
| SCIENCE | 80 |

F I G. 1 1 A

| PSEUDONYM ID | 123456 |
|---|---|
| ENGLISH | 85 |
| JAPANESE | 70 |
| MATHEMATICS | 100 |
| SOCIAL STUDIES | 20 |
| SCIENCE | 80 |

F I G. 1 1 B

| PSEUDONYM ID | 123456 | |
|---|---|---|
| ANALYSIS RESULT ID | data001 | |
| | SCORE | DEVIATION VALUE |
| ENGLISH | 85 | 62 |
| JAPANESE | 70 | 50 |
| MATHEMATICS | 100 | 65 |
| SOCIAL STUDIES | 20 | 45 |
| SCIENCE | 80 | 60 |

F I G. 1 1 C

| PSEUDONYM ID | ANALYSIS RESULT ID |
|---|---|
| 123456 | data001 |
| ... | ... |

| FIRST SESSION ID | status |
|---|---|
| xxxx001 | A6 |
| ... | ... |

72a

| FIRST SESSION ID | USER ID | COMMUNICATION PARTNER FOR WHICH SECOND SESSION ID IS USED | SECOND SESSION ID | ACCESS IDENTIFIER | COMMUNICATION PARTNER FOR WHICH THIRD SESSION ID IS USED | THIRD SESSION ID |
|---|---|---|---|---|---|---|
| xxxx001 | hanako | ... | | | | |
| ... | ... | ... | ... | ... | ... | ... |

72b

| FIRST SESSION ID | USER ID | COMMUNICATION PARTNER FOR WHICH SECOND SESSION ID IS USED | SECOND SESSION ID | ACCESS IDENTIFIER | COMMUNICATION PARTNER FOR WHICH THIRD SESSION ID IS USED | THIRD SESSION ID |
|---|---|---|---|---|---|---|
| xxxx001 | hanako | https://kaisekiservice1.com | | | | |
| ... | ... | ... | ... | ... | ... | ... |

73b

| FIRST SESSION ID | status |
|---|---|
| xxxx001 | A9 |
| ... | ... |

52a

| SECOND SESSION ID | GROUP ACCOUNT | ACCESS IDENTIFIER | PSEUDONYM ID |
|---|---|---|---|
| s0001 | d001 | ... | ... |

72c

| FIRST SESSION ID | USER ID | COMMUNICATION PARTNER FOR WHICH SECOND SESSION ID IS USED | SECOND SESSION ID | ACCESS IDENTIFIER | COMMUNICATION PARTNER FOR WHICH THIRD SESSION ID IS USED | THIRD SESSION ID |
|---|---|---|---|---|---|---|
| xxxx001 | hanako | https://kaisekiservice1.com | s0001 | ... | ... | ... |

FIG. 14

| ACCESS IDENTIFIER | status |
|---|---|
| ac001 | REGISTRATION IN PROGRESS |
| ac002 | REGISTRATION COMPLETED |
| ... | ... |

54a

| SECOND SESSION ID | GROUP ACCOUNT | ACCESS IDENTIFIER | PSEUDONYM ID |
|---|---|---|---|
| s0001 | d001 | ac001 | |
| ... | ... | ... | ... |

52b

| FIRST SESSION ID | USER ID | COMMUNICATION PARTNER FOR WHICH SECOND SESSION ID IS USED | SECOND SESSION ID | ACCESS IDENTIFIER | COMMUNICATION PARTNER FOR WHICH THIRD SESSION ID IS USED | THIRD SESSION ID |
|---|---|---|---|---|---|---|
| xxxx001 | hanako | https://kaisekiservice1.com | s0001 | ac001 | https://abc.ed.jp | |
| ... | ... | ... | ... | ... | ... | ... |

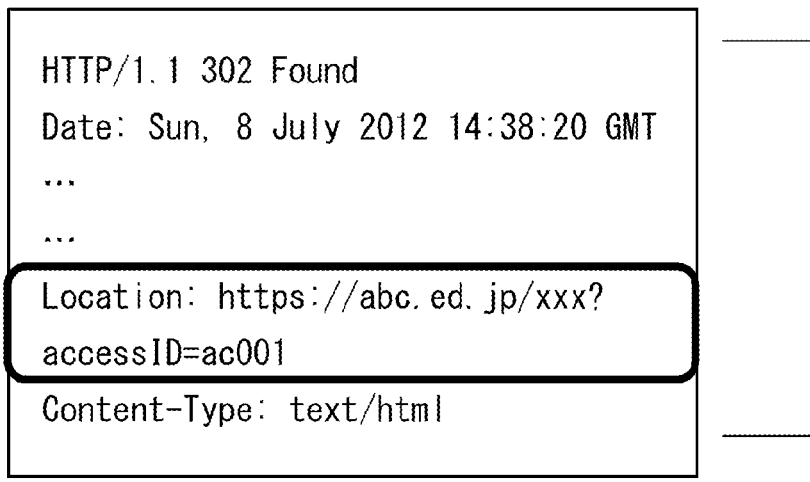
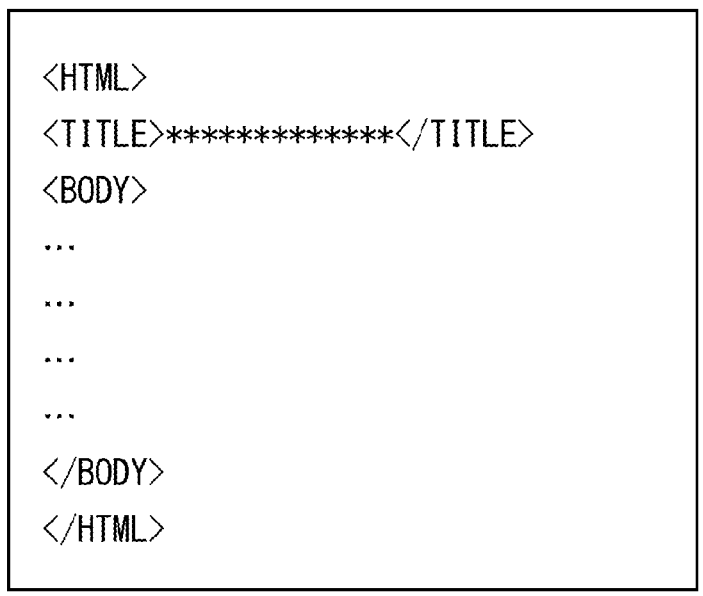
FIG. 16

FIG. 17

Table 22a:

| STUDENT ID | PSEUDONYM ID | THIRD SESSION ID |
|---|---|---|
| 980612 | 123456 | zzzzzz |
| ... | ... | ... |

Table 72e:

| FIRST SESSION ID | USER ID | COMMUNICATION PARTNER FOR WHICH SECOND SESSION ID IS USED | SECOND SESSION ID | ACCESS IDENTIFIER | COMMUNICATION PARTNER FOR WHICH THIRD SESSION ID IS USED | THIRD SESSION ID |
|---|---|---|---|---|---|---|
| xxxx001 | hanako | https://kaisekiservice1.com | s0001 | ac001 | https://abc.ed.jp | zzzzzz |
| ... | ... | ... | ... | ... | ... | ... |

Table 22b:

| STUDENT ID | PSEUDONYM ID | THIRD SESSION ID | ACCESS IDENTIFIER |
|---|---|---|---|
| 980612 | 123456 | zzzzzz | ac001 |
| ... | ... | ... | ... |

| ACCESS IDENTIFIER | status | |
|---|---|---|
| ac001 | REGISTRATION COMPLETED | ~54b |
| ac002 | REGISTRATION COMPLETED | |
| ... | ... | |

| SECOND SESSION ID | GROUP ACCOUNT | ACCESS IDENTIFIER | PSEUDONYM ID | |
|---|---|---|---|---|
| s0001 | d001 | ac001 | 123456 | ~52c |
| ... | ... | ... | ... | |

F I G. 1 8

| SECOND SESSION ID | GROUP ACCOUNT | PROVISIONAL TOKEN | PSEUDONYM ID | ~94a |
|---|---|---|---|---|
| s0001 | d001 | | | |
| ... | ... | ... | ... | |

| FIRST SESSION ID | USER ID | COMMUNICATION PARTNER FOR WHICH SECOND SESSION ID IS USED | SECOND SESSION ID | PROVISIONAL TOKEN | COMMUNICATION PARTNER FOR WHICH THIRD SESSION ID IS USED | THIRD SESSION ID | ~72f |
|---|---|---|---|---|---|---|---|
| xxxx001 | hanako | https://kaisekiservice1.com | s0001 | | https://abc.ed.jp | | |
| ... | ... | ... | ... | ... | ... | ... | |

| STUDENT ID | PSEUDONYM ID | THIRD SESSION ID | PROVISIONAL TOKEN | ~22c |
|---|---|---|---|---|
| 980612 | 123456 | zzzzzz | ktk001 | |
| ... | ... | ... | ... | |

| FIRST SESSION ID | USER ID | COMMUNICATION PARTNER FOR WHICH SECOND SESSION ID IS USED | SECOND SESSION ID | PROVISIONAL TOKEN | COMMUNICATION PARTNER FOR WHICH THIRD SESSION ID IS USED | THIRD SESSION ID | ~72g |
|---|---|---|---|---|---|---|---|
| xxxx001 | hanako | https://kaisekiservice1.com | s0001 | ktk001 | https://abc.ed.jp | zzzzzz | |
| ... | ... | ... | ... | ... | ... | ... | |

| SECOND SESSION ID | GROUP ACCOUNT | PROVISIONAL TOKEN | PSEUDONYM ID | ~94b |
|---|---|---|---|---|
| s0001 | d001 | ktk001 | 123456 | |
| ... | ... | ... | ... | |

F I G. 2 2

COMMUNICATION SYSTEM, COMMUNICATION APPARATUS, COMMUNICATION METHOD, AND STORAGE MEDIUM

CROSS-REFERENCE TO RELATED APPLICATION

This application is based upon and claims the benefit of priority of the prior Japanese Patent Application No. 2012-202526, filed on Sep. 14, 2012, the entire contents of which are incorporated herein by reference.

FIELD

The embodiments discussed herein are related to a communication performed between a plurality of communication apparatuses.

BACKGROUND

In recent years, analysis agents have provided a service to analyze data obtained from a client via, for example, a Virtual Private Network (VPN), and to provide the client with results obtained from the analyzing. When the client requests, for each user, an analysis result on data obtained from each individual user, data to be analyzed is associated with personal information to identify the user. Accordingly, in many cases, in order to prevent personal information from leaking from data given to the analysis agent, clients perform a process of replacing the personal information with, for example, pseudonym, which can uniquely specify an individual, and then give the processed data to the analysis agent. The analysis agent analyzes the data obtained from the client and associates an analysis result for each user with pseudonym. In addition, the analysis agent associates the obtained analysis result with pseudonym and then provides the client with this result. The client replaces the pseudonym associated with the analysis result obtained from the analysis agent with personal information of a user. Meanwhile, the user requests an analysis result obtained for this user from the client. Accordingly, the client provides the user who has requested an analysis result with the analysis result associated with this user.

As a related art, a single sign-on system is known that includes: a user terminal; a service server; and an authentication server for performing authentication when the user terminal logs in the service server. When authentication is successful, the authentication server connects a user ID with an identifier unique to the service server which has made a request for authentication, and generates an encrypted new ID, and transmits it to the user terminal. When a service use is requested together with a new ID, the service server obtains user information from the authentication server by using the new ID. A system is also known wherein, when a line ID corresponding to an address specified by inquiring with a network management device is identical with a registered line ID specified based on a link ID, encrypted information for presentation information corresponding to the link ID and the registered link ID is transmitted to a user terminal.

PRIOR ART DOCUMENTS

Patent Documents

Patent document 1: Japanese Laid-open Patent Publication No. 2011-145754

Patent document 2: Japanese Laid-open Patent Publication No. 2008-42819

As described above in "BACKGROUND", when a user wishes to obtain, via the client, an analysis result obtained for the user, the analysis result is sent from the analysis agent to the client and is then sent from the client to the user. Allowing individual users to directly request the analysis result obtained for data on them from the analysis agent will improve user convenience and, in addition, decrease the processing load on a data server. However, in order to access a server of the analysis agent, a user obtains pseudonym which substitute as personal information of the user, and then makes a request for the server of the analysis agent to allow an analysis result corresponding to the obtained pseudonym to be referenced. However, there is a risk of leakage of information of pseudonym in reporting of pseudonym to a terminal used by the user. When information of pseudonym is leaked, the pseudonym need to be changed, thereby making the process complicated and incurring a cost.

SUMMARY

According to an aspect of the embodiments, a communication system includes a data server, an analysis server, and a communication apparatus that communicates with the data server and the analysis server. The data server stores, in association with each other, data obtained by the data server and user identification information that identifies a user, and transmits to the analysis server the data and first identification information associated with the user identification information. The analysis server analyzes the data obtained from the data server and stores an analysis result in association with the first identification information. Upon receipt of the user identification information and an analysis-result obtainment request, the communication apparatus transmits the analysis-result obtainment request to the analysis server. Upon receipt of the analysis-result obtainment request, the analysis server generates and transmits, to the communication apparatus, second identification information associated with the analysis-result obtainment request. Upon receipt of the second identification information, the communication apparatus transmits the second identification information and the user identification information to the data server. Upon receipt of the second identification information and the user identification information, the data server transmits the second identification information and the first identification information associated with the user identification information to the analysis server. Upon receipt of the first identification information and the second identification information, the analysis server transmits the analysis result and the second identification information to the communication apparatus. Upon receipt of the analysis result and the second identification information, the communication apparatus transmits the analysis result to a requestor that has made the analysis-result obtainment request received by the communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an exemplary communication method in accordance with an embodiment.

FIG. 4 illustrates an example of a pseudonym-ID table.

FIG. 6 illustrates an example of an account table.

FIG. 7 illustrates an exemplary configuration of a communication apparatus.

FIG. 8 illustrates an example of an ID management table.

FIG. 10 illustrates an example of a hardware configuration of a server and a terminal.

FIG. 11A to FIG. 11D illustrate a method for generating substituted data and illustrate an example of an analysis result of substituted data.

FIG. 13 illustrates an example of updating of information via communication between a terminal and a communication apparatus.

FIG. 14 illustrates an example of updating of information via authentication between a communication apparatus and an analysis server.

FIG. 15 illustrates an example of updating of information in reporting of an access identifier from an analysis server to a communication apparatus.

FIG. 16 illustrates an example of a registration request message.

FIG. 17 illustrates an example of updating of information through communication between a communication apparatus and a data server.

FIG. 18 illustrates an example of updating of information after an access identifier is registered in a data server.

FIG. 22 illustrates updating of information performed in a second embodiment.

DESCRIPTION OF EMBODIMENTS

Figure 2:
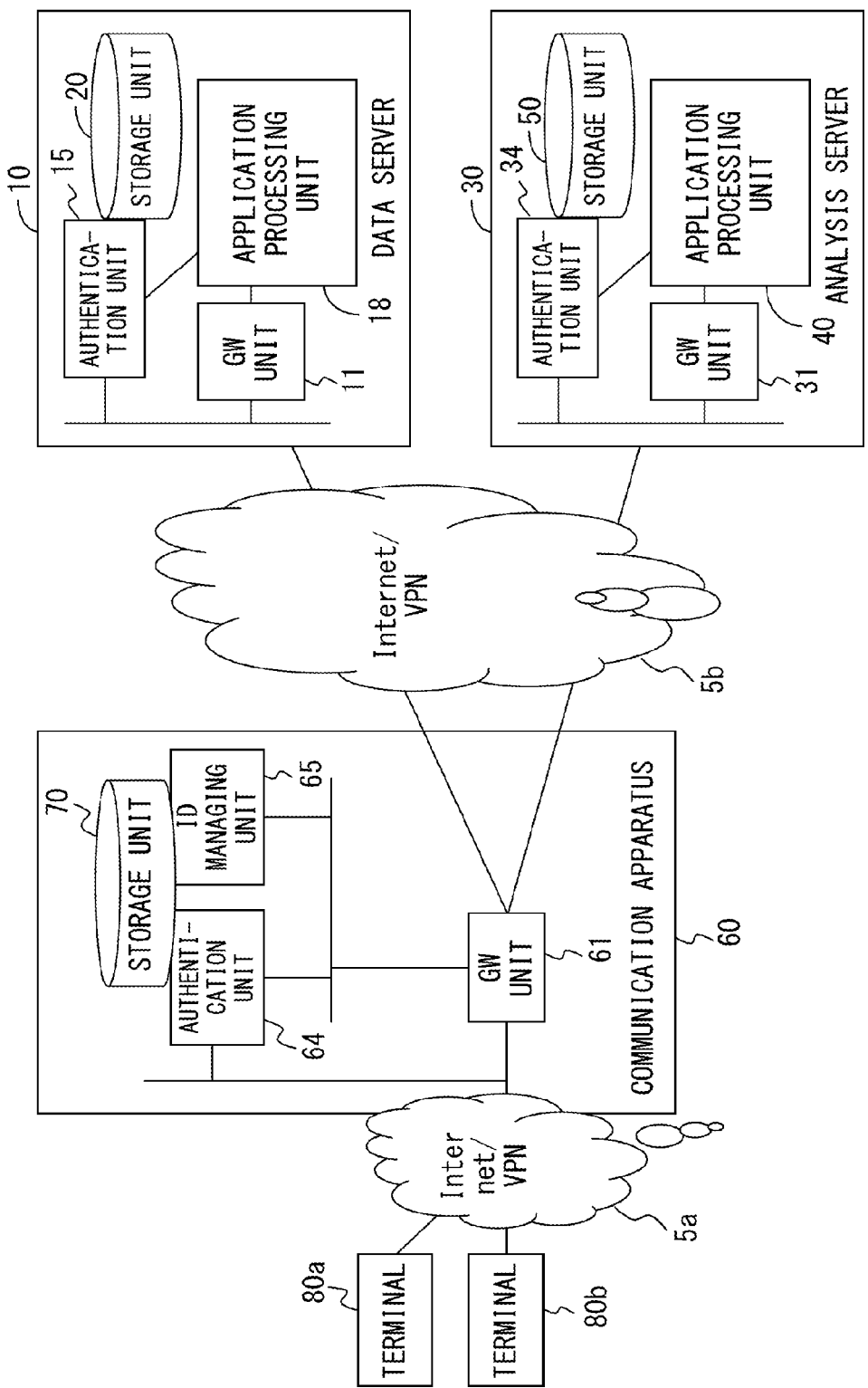
FIG. 2 illustrates an exemplary system configuration.

FIG. 1 illustrates an exemplary communication method in accordance with an embodiment. FIG. 1 depicts an example of communication performed between a communication apparatus 60 of user A, a data server 10, and an analysis server 30. User A belongs to group G. Examples of group G include a company, a school, a hospital, a municipality, and so on. The data server 10 holds data on users belonging to group G.

(1) The data server 10 stores data on each user belonging to group G and a pseudonym ID (a pseudonym) for each user. The data server 10 extracts, from data on each user, concealed information for each user and generates substituted data obtained by replacing the concealed information with a pseudonym ID associated with the user. The concealed information includes one or more other pieces of privacy information of the user such as an ID, a name, an address, sex, and age for user identification. Information provided in place of concealed information will hereinafter be referred to as a "pseudonym ID" or "pseudonym". In the example illustrated in FIG. 1, the concealed information related to user A is replaced with the pseudonym a.

Optionally, substituted data may include information obtained by encrypting or masking concealed information in an arbitrary format such that the analysis server 30 does not obtain the concealed information. Accordingly, in the following descriptions, replacing concealed information with a pseudonym ID includes, in addition to deleting the concealed information from data on a user and adding the pseudonym ID, adding a pseudonym ID to data obtained by encrypting or masking concealed information included in the data on the user.

(2) The data server 10 transmits substituted data to the analysis server 30.

(3) The analysis server 30 analyzes data included in the substituted data and holds an analysis result. An analysis result for each user, which is associated with a pseudonym of each user, is held. As an example, an analysis result related to data on user A is associated with pseudonym a and is held in the analysis server 30.

(4) The communication apparatus 60 accesses the analysis server 30 using an identifier that identifies a group to which the user belongs (a group identifier) and requests an analysis result. As an example, the communication apparatus 60 may use an account that identifies group G as a group identifier.

(5) Upon receipt of a request message that requests an analysis result, the analysis server 30 generates an access identifier ($\alpha$) for the request message.

(6) The analysis server 30 reports (i.e. notifies) access identifier $\alpha$ to the communication apparatus 60.

(7) The communication apparatus 60 reports to the data server 10 the access identifier reported from the analysis server 30. The communication apparatus 60 also transmits to the data server 10 information that identifies a user for whom an analysis result is requested (a user identifier). In the example illustrated in FIG. 1, the combination of access identifier $\alpha$ and the user identifier that identifies user A is reported from the communication apparatus 60 to the data server 10.

(8) Using the received combination of the user identifier and the access identifier, the data server 10 associates the access identifier with a pseudonym ID. As an example, the data server 10 recognizes, from the information received from the communication apparatus 60, that access identifier $\alpha$ has been allocated to user A. Accordingly, the data server 10 associates access identifier $\alpha$ with pseudonym a associated with user A.

(9) The data server 10 reports to the analysis server 30 the pseudonym ID associated with the reported access identifier. In the example illustrated in FIG. 1, the data server 10 reports to the analysis server 30 that the pseudonym ID associated with access identifier $\alpha$ is a.

(10) For an analysis result associated with the pseudonym ID reported from the data server 10, the analysis server 30 determines that a request to transmit the analysis result has been made. That is, in procedure (4), the analysis server 30 determines that the communication apparatus 60 has requested the analysis result associated with pseudonym a.

(11) The analysis server 30 transmits the analysis result associated with pseudonym a to the communication apparatus 60.

(12) The communication apparatus 60 obtains an analysis result for user A from the analysis server 30.

Using the communication method described with reference to FIG. 1, the communication apparatus 60 may request an analysis result directly from the analysis server 30 without obtaining a pseudonym ID of a user who has requested the analysis result. In addition, in the communication method in accordance with the embodiment, pseudonym IDs are obtained by only the data server 10 and the analysis server 30, so pseudonym IDs become highly confidential. Moreover, data to be concealed such as personal information of a user belonging to group G is not transmitted to the analysis server 30, so there is no risk of leakage of, for example, personal information even if the analysis server 30 is administered by a third party having nothing to do with group G.

For clarification, a situation in which the communication apparatus 60 is used by an individual user was described with reference to the example of FIG. 1, but the communication apparatus 60 may be an apparatus that receives access from a plurality of users, such as a server that provides portal sites.

<System Configuration and Apparatus Configuration>

FIG. 2 illustrates an exemplary system configuration. In the following, an exemplary situation will be described in which a communication apparatus 60 receives access from a plurality of users. Using a particular terminal 80 (80a and 80b), each user accesses the communication apparatus 60 via an internet 5a. For a data server 10 and an analysis server 30, the communication apparatus 60 performs a proxy authentication process as a proxy for the terminal 80 of each user. The communication apparatus 60 communicates with the data server 10 and the analysis server 30 via an internet 5b. Apparatus configurations of the data server 10, the analysis server 30, the communication apparatus 60, and the terminal 80 will be described hereinafter. A VPN is used as appropriate for communication performed via the internet 5a or 5b.

Figure 3:
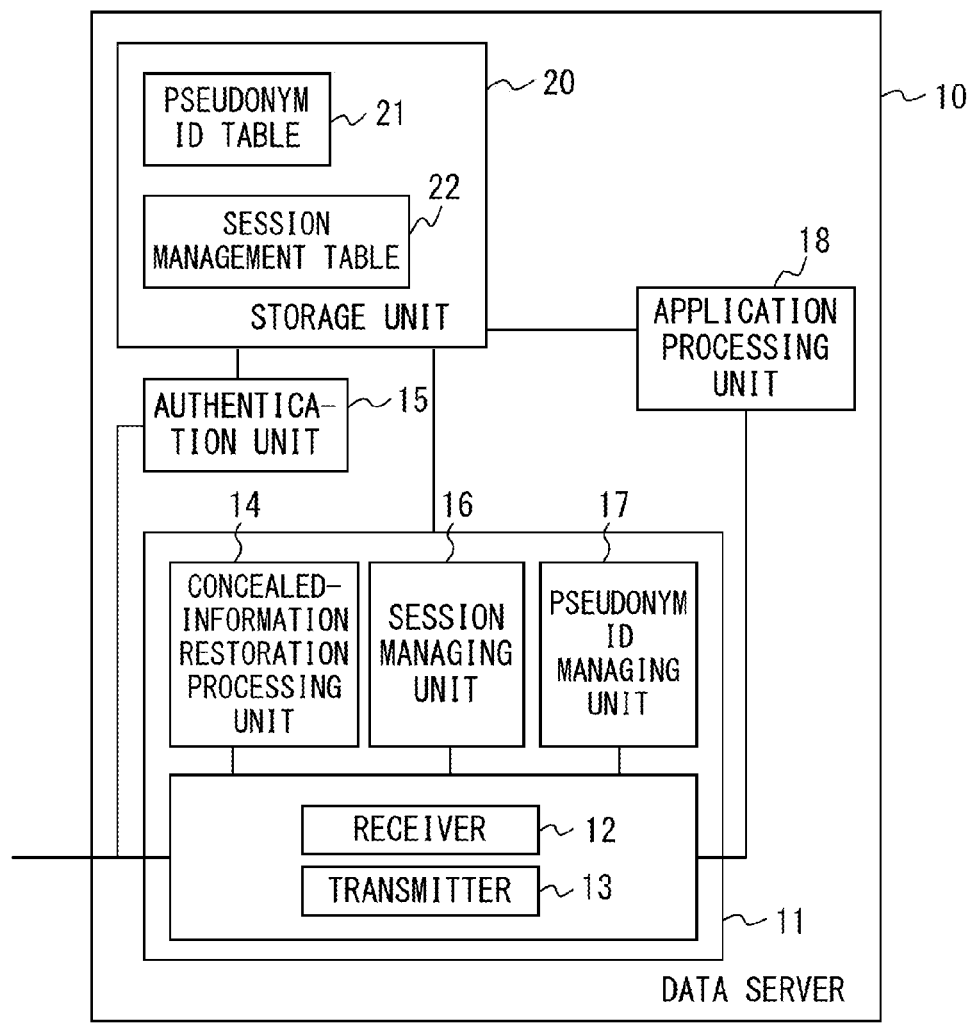
FIG. 3 illustrates an exemplary configuration of a data server.

FIG. 3 illustrates an exemplary configuration of the data server 10. The data server 10 includes a gateway unit 11, an authentication unit 15, an application processing unit 18, and a storage unit 20. The gateway unit 11 includes a receiver 12, a transmitter 13, a concealed-information restoration processing unit 14, a session managing unit 16, and a pseudonym-ID managing unit 17. The storage unit 20 holds a pseudonym-ID table 21 and a session management table 22 and further stores data used by, for example, the gateway unit 11, the authentication unit 15, and the application processing unit 18.

The receiver 12 receives data from the communication apparatus 60 and the analysis server 30 via the internet 5b. In accordance with a type of the received data, the receiver 12 distributes the data to the authentication unit 15, the concealed-information restoration processing unit 14, the session managing unit 16, the pseudonym-ID managing unit 17, and the application processing unit 18. The transmitter 13 transmits data input from the authentication unit 15, the concealed-information restoration processing unit 14, the session managing unit 16, the pseudonym-ID managing unit 17, and the application processing unit 18. The transmitter 13 transmits data to the analysis server 30 and the communication apparatus 60 via the internet 5b.

Figure 4:
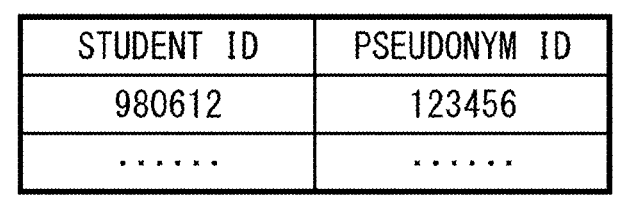

The concealed-information restoration processing unit 14 extracts concealed information from data on each user and generates substituted data by replacing the concealed information with a pseudonym ID associated with the user. By referencing the pseudonym-ID table 21, the concealed-information restoration processing unit 14 determines a pseudonym ID that is used to generate substituted data. The pseudonym-ID table 21 associates information that uniquely identifies a user with a pseudonym ID that is added to data on the user in the generating of substituted data. An example of the pseudonym-ID table 21 is illustrated in FIG. 4. FIG. 4 depicts an example in which users are students and a group is a school, wherein a student ID of each user is associated with a pseudonym ID.

The authentication unit 15 performs an authentication process on a user who has accessed the data server 10 and determines whether the accessing user is authorized to use the data server 10. The authentication unit 15 stores information of the combination of an account and a password for each individual user who is authorized to access the data server 10. The account allocated to each user will hereinafter be referred to as a "user account". When authentication by the authentication unit 15 succeeds, the session managing unit 16 generates a session ID. The session managing unit 16 transmits the session ID via the transmitter 13 to the communication apparatus 60, for which authentication has succeeded. In addition, the session managing unit 16 generates the session management table 22 by associating each session with information related to a user performing communication using the session. An example of the session management table 22 and an example of a method for using the session management table 22 will be described hereinafter.

When a change is made to the pseudonym-ID table 21, the pseudonym-ID managing unit 17 revises the pseudonym-ID table 21. The pseudonym-ID table 21 may be changed in accordance with a contract between an administrator of the data server 10 and a user. An operator may transmit, from a communication apparatus that is used to control the data server 10 to the pseudonym-ID managing unit 17, a message that reports details of a change in the pseudonym-ID table 21, thereby revising the pseudonym-ID table 21. Using an application, the application processing unit 18 performs a process on data input from the receiver 12.

Figure 5:
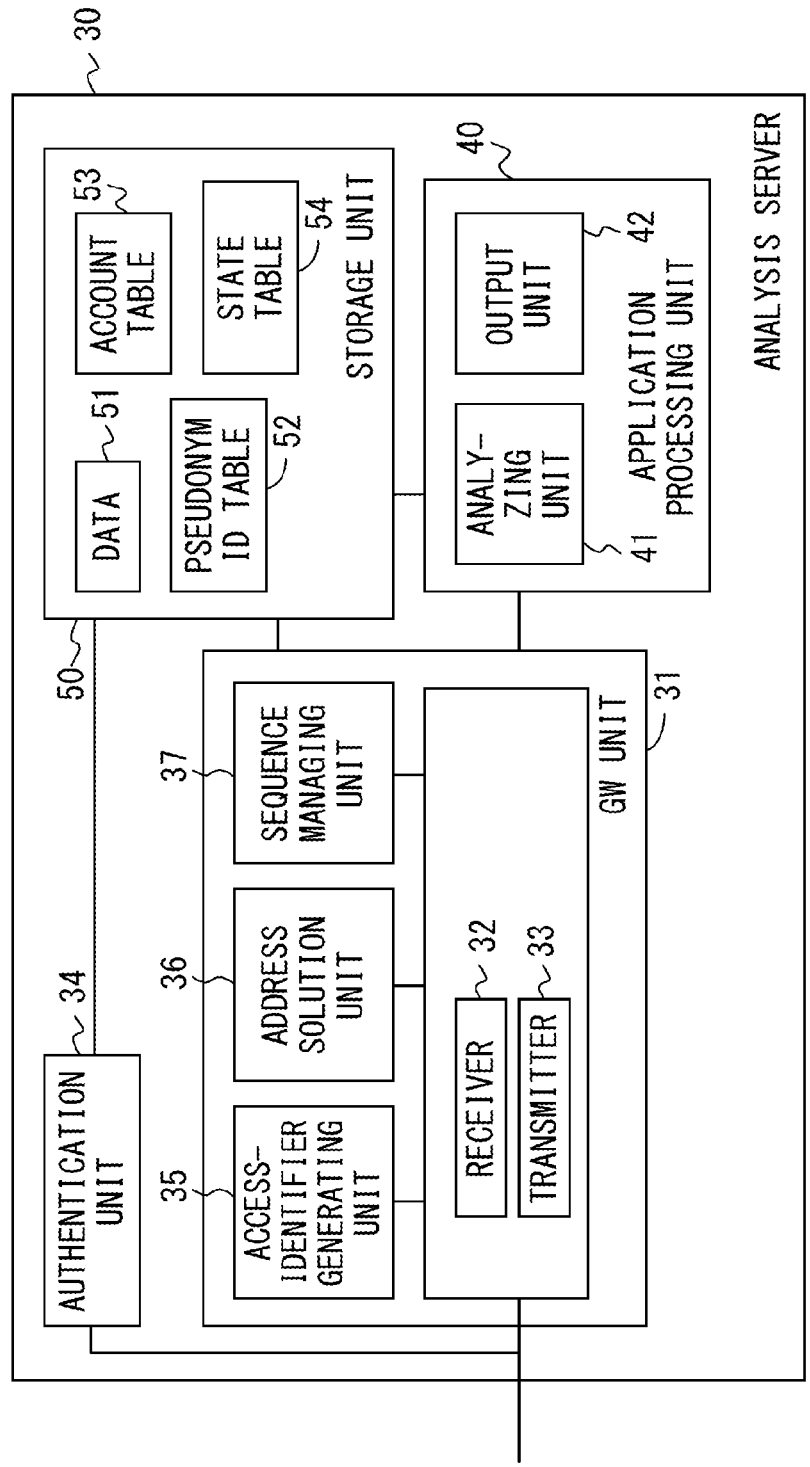
FIG. 5 illustrates an exemplary configuration of an analysis server.

FIG. 5 illustrates an exemplary configuration of the analysis server 30. The analysis server 30 includes a gateway unit 31, an authentication unit 34, an application processing unit 40, and a storage unit 50. The gateway unit includes a receiver 32, a transmitter 33, an access-identifier generating unit 35, an address solution unit 36, and a sequence managing unit 37.

The receiver 32 receives data from the communication apparatus 60 and the data server 10 via the internet 5b and, in accordance with a type of the received data, distributes the data to the authentication unit 34, the access-identifier generating unit 35, the address solution unit 36, the sequence managing unit 37, and the application processing unit 40. The transmitter 33 transmits data input from the authentication unit 34, the access-identifier generating unit 35, the address solution unit 36, the sequence managing unit 37, and the application processing unit 40. The transmitter 13 transmits data to the data server 10 and the communication apparatus 60 via the internet 5b.

The authentication unit 34 performs an authentication process on a user who has accessed the analysis server 30 and determines whether the accessing user is authorized to use the analysis server 30. Each user makes a request for the analysis server 30 to perform authentication using an account allocated to a group to which the user belongs. Accordingly, for a group authorized to access the analysis server 30, the authentication unit 34 stores information of the combination of an account and a password. An account of each group stored in the authentication unit 34 will hereinafter be referred to as a "group account". When authentication by the authentication unit 34 succeeds, the access-identifier generating unit 35 generates and transmits a session ID via the transmitter 33 to an apparatus for which authentication has succeeded. In addition, when the analysis server 30 receives a request message that requests an analysis result, the access-identifier generating unit 35 generates an access identifier. The access-identifier generating unit 35 may associate the access identifier with a session ID and may record this access identifier in a pseudonym-ID table 52 of the storage unit 50.

The address solution unit 36 uses an account table 53. The account table 53 associates a group account with identification information that identifies the data server 10 that holds data on a group identified by the group account. When an analysis-service contract is made between the data server 10 and the analysis agent, the account table 53 is generated before the analysis service is provided. FIG. 6 illustrates an example of the account table 53. In the example of FIG. 6, a URL (Uniform Resource Locator) that is used by a user to access the data server 10 is used as identification information. The identification information is not limited to a URL but may be, for example, an IP address (Internet Protocol address) allocated to the data server 10. For each access identifier, the sequence managing unit 37 determines whether the access identifier has been registered in the data server 10, and records the result of determining in a state table 54. An example of the state table 54 will be described hereinafter.

The application processing unit 40 includes an analyzing unit 41 and an output unit 42. The analyzing unit 41 analyzes substituted data received from the data server 10 and generates an analysis result. The analysis result is stored as data 51. When the analysis server 30 is notified of a pseudonym ID corresponding to a user for whom a request to output an analysis result has been made by a request message, the output unit 42 generates and outputs, to the transmitter 33, a packet that includes an analysis result associated with the pseudonym ID that the analysis server 30 has been notified of. The transmitter 33 transmits to a source of the request message the packet input from the output unit 42.

The storage unit 50 holds the data 51, the pseudonym-ID table 52, the account table 53, and the state table 54. The data 51 includes an analysis result. The storage unit 50 further stores data obtained from a process performed by the gateway unit 31, the authentication unit 34, and the application processing unit 40, and data used in a process performed by the gateway unit 31, the authentication unit 34, and the application processing unit 40.

FIG. 7 illustrates an exemplary configuration of the communication apparatus 60. The communication apparatus 60 includes a gateway unit 61, an authentication unit 64, an ID managing unit 65, and a storage unit 70. The gateway unit 61 includes a receiver 62, a transmitter 63, a proxy authentication unit 66, a session managing unit 67, and a sequence managing unit 68. The storage unit 70 holds an ID management table 71, a cooperation table 72, and a session management table 73, and stores data generated in a process performed by the gateway unit 61, the transmitter 63, and the ID managing unit 65.

The receiver 62 receives data from the terminal 80 via the internet 5a and further receives data from the data server 10 and the analysis server 30 via the internet 5b. Moreover, in accordance with a type of the received data, the receiver 62 distributes the data to the authentication unit 64, the ID managing unit 65, the proxy authentication unit 66, the session managing unit 67, and the sequence managing unit 68. The transmitter 63 transmits data to the terminal 80 via the internet 5a and further transmits data to the data server 10 and the analysis server 30 via the internet 5b.

The authentication unit 64 performs an authentication process regarding the terminal 80, which has accessed the communication apparatus 60, and determines whether a user accessing via the terminal 80 is authorized to use the communication apparatus 60. The authentication unit 64, which stores an account and a password for each user authorized to access the communication apparatus 60, performs an authentication process using the account and the password. The session managing unit 67 generates a session ID for the terminal 80, for which authentication has succeeded. The session managing unit 67 also manages information of the session ID that is used for communication between the communication apparatus 60 and the analysis server 30 and for communication between the communication apparatus 60 and the data server 10. To easily distinguish between session IDs, a session ID shared between the terminal 80 and the communication apparatus 60 and a session ID shared between the communication apparatus 60 and the analysis server 30 will hereinafter be referred to as a "first session ID" and a "second session ID", respectively. In addition, a session ID shared between the communication apparatus 60 and the data server 10 will be referred to as a "third session ID".

The ID managing unit 65 performs a process of updating the ID management table 71. The ID management table 71 holds information related to a user for whom the communication apparatus 60 performs proxy authentication. The ID management table 71 is generated or updated when a contract is made between a user and an agent that provides a service via the communication apparatus 60. Information that identifies an access destination for each user and information that is used for authentication at the access destination are associated with each other and recorded in the ID management table 71. FIG. 8 illustrates an example of the ID management table 71. Referring to the example of FIG. 8, the URLs of access destinations, for which the communication apparatus 60 performs proxy authentication, and accounts and passwords, both used for authentication at the access destinations, are associated with a user ID and recorded. The proxy authentication unit 66 performs proxy authentication using information from the ID management table 71.

For each user, the session managing unit 67 manages the values of first, second, and third session IDs and information of a communication partner in a communication performed using the second or third session ID. With reference to a session ID, the sequence managing unit 68 specifies a situation of a communication specified by the session ID and records this specified situation in the session management table 73.

Figure 9:
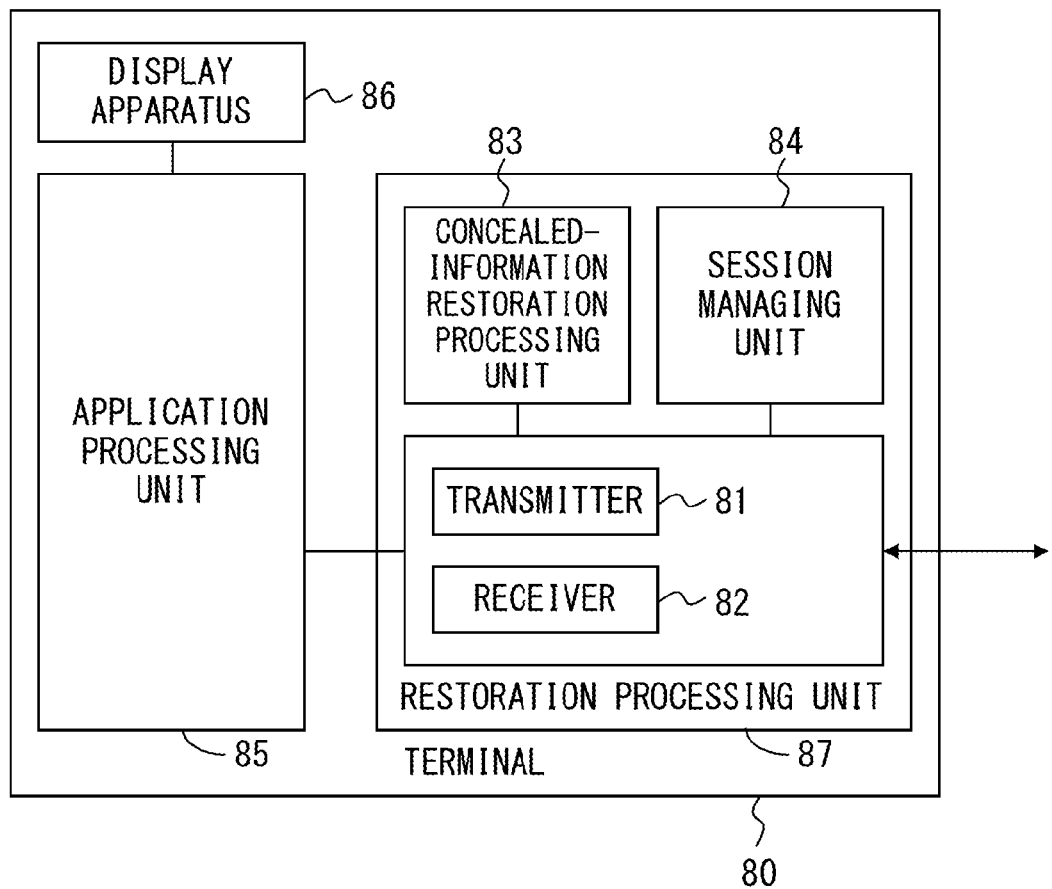
FIG. 9 illustrates an exemplary configuration of a terminal.

FIG. 9 illustrates an exemplary configuration of the terminal 80. The terminal 80 includes an application processing unit 85, a display apparatus 86, and a restoration processing unit 87. The restoration processing unit 87 includes a transmitter 81, a receiver 82, a concealed-information restoration processing unit 83, and a session managing unit 84. The transmitter 81 transmits data to the communication apparatus 60, and the receiver 82 receives data from the communication apparatus 60. To encrypt data to be transmitted to the communication apparatus 60, the concealed-information restoration processing unit performs an encrypting process. In addition, when encrypted data is received from the communication apparatus 60 via the receiver 62, the concealed-information restoration processing unit 83 decrypts this received data. The session managing unit 84 holds and properly updates session information that is used for communication with the communication apparatus 60. Using an application, the application processing unit 85 processes data. The display apparatus 86 allows a user to visually check data processed by the terminal 80. As an example, the display apparatus 86 displays a result of a process performed by the application processing unit 85.

FIG. 10 illustrates an example of a hardware configuration of a server and the terminal 80. The data server 10, the analysis server 30, the communication apparatus 60, and the terminal 80 may all have the hardware configuration depicted in FIG. 10. The server includes a processor 101, a memory 102, an input apparatus 103, an output apparatus 104, a bus 105, an external storage apparatus 106, a medium driving apparatus 107, and a network connecting apparatus 109. The data server 10, the analysis server 30, the communication apparatus 60, and the terminal 80 may be achieved as, for example, a computer.

The processor 101 may be any processing circuit that includes a Central Processing Unit (CPU). In the data server 10, the processor 101 is operated as the concealed-information restoration processing unit 14, the authentication unit 15, the session managing unit 16, the pseudonym-ID managing unit 17, and the application processing unit 18. In the analysis server 30, the processor 101 is operated as the authentication unit 34, the access-identifier generating unit 35, the address solution unit 36, the sequence managing unit 37, and the application processing unit 40. In the communication apparatus 60, the processor 101 is operated as the authentication unit 64, the ID managing unit 65, the proxy authentication unit 66, the session managing unit 67, and the sequence managing unit 68. In the terminal 80, the processor 101 is operated as the concealed-information restoration processing unit 83, the session managing unit 84, and the application processing unit 85. The processor 101 may execute a program stored in, for example, the external storage apparatus 106.

The memory 102 properly stores data obtained from an operation by the processor 101 and data used for a process performed by the processor 101. The memory 102 is operated as the storage unit 20 for the data server 10, the storage unit 50 for the analysis server 30, and the storage unit 70 for the communication apparatus 60.

The network connecting apparatus 109 performs a process for communication with another apparatus. The network connecting apparatus 109 is operated as the receiver 12 and the transmitter 13 for the data server 10 and as the receiver 32 and the transmitter 33 for the analysis server 30. The network connecting apparatus 109 is also operated as the receiver 62 and the transmitter 63 for the communication apparatus 60 and as the transmitter 81 and the receiver 82 for the terminal 80.

The input apparatus 103 is achieved as, for example, a button, a keyboard, or a mouse, and the output apparatus 104 is achieved as, for example, a display. As an example, in the terminal 80, the output apparatus 104 is operated as the display apparatus 86. The bus 105 establishes a connection that allows data to be passed between the processor 101, the memory 102, the input apparatus 103, the output apparatus 104, the external storage apparatus 106, the medium driving apparatus 107, and the network connecting apparatus 109. The external storage apparatus 106 stores, for example, a program and data and properly provides stored information to, for example, the processor 101. The medium driving apparatus 107 may output data from the memory 102 and the external storage apparatus 106 to a portable storage medium 108, and a program, data, and so on may be read from the portable storage medium 108. The portable storage medium 108 may be any portable storage medium, including a floppy disk, a Magneto-Optical (MO) disc, a Compact Disc Recordable (CD-R), and a Digital Versatile Disk Recordable (DVD-R).

First Embodiment

In the following, an exemplary situation will be described in which F High School administers the data server 10 and a request has been made for the analysis server 30 to analyze test results of students. Thus, the following descriptions are based on the assumption that users who attempt to reference the analysis server 30 are students of F High School. The analysis server 30 transmits, to a user who has made a request to provide an analysis result, data obtained from a test result of the user.

FIG. 11 illustrate a method for generating substituted data and illustrate an example of an analysis result of substituted data. FIG. 11A depicts an example of a test result of one of the students for whom an analysis is made. A test result of each subject is associated with the name or student ID of an examinee. In this example, the name and the student ID of examinees are concealed from a third party and are treated as concealed information. Accordingly, the pseudonym-ID managing unit 17 of the data server 10 determines pseudonym IDs that can uniquely identify a student for whom a test result is obtained, thereby generating a pseudonym-ID table 21 (see FIG. 4). After the pseudonym-ID table 21 is generated, the concealed-information restoration processing unit 14 replaces concealed information with a pseudonym ID using the pseudonym-ID table 21. To convert the test result illustrated in FIG. 11A into substituted data using the pseudonym-ID table 21 illustrated in FIG. 4, the concealed-information restoration processing unit 14 replaces the student ID and the name, both of which are concealed information, with a pseudonym ID associated with the student ID. Thus, the concealed-information restoration processing unit 14 generates the substituted data illustrated in FIG. 11B from the information illustrated in FIG. 11A. The concealed-information restoration processing unit 14 performs a similar process for the test results of all of the students for whom a request is made for the analysis server 30 to make an analysis. In addition, the concealed-information restoration processing unit 14 transmits the generated substituted data to the analysis server 30.

Upon receipt of substituted data from the data server 10, the analyzing unit 41 of the analysis server 30 analyzes the substituted data. An analysis result for each user is recorded after it is associated with a pseudonym ID. When a result obtained from an analysis is a deviation value of each subject, the analyzing unit 41 may hold the analysis result illustrated in FIG. 11C for the user with pseudonym ID=123456. Meanwhile, as illustrated in FIG. 11D, the analyzing unit 41 may generate metadata to easily determine whether an analysis result is present for each user.

Figure 12A:
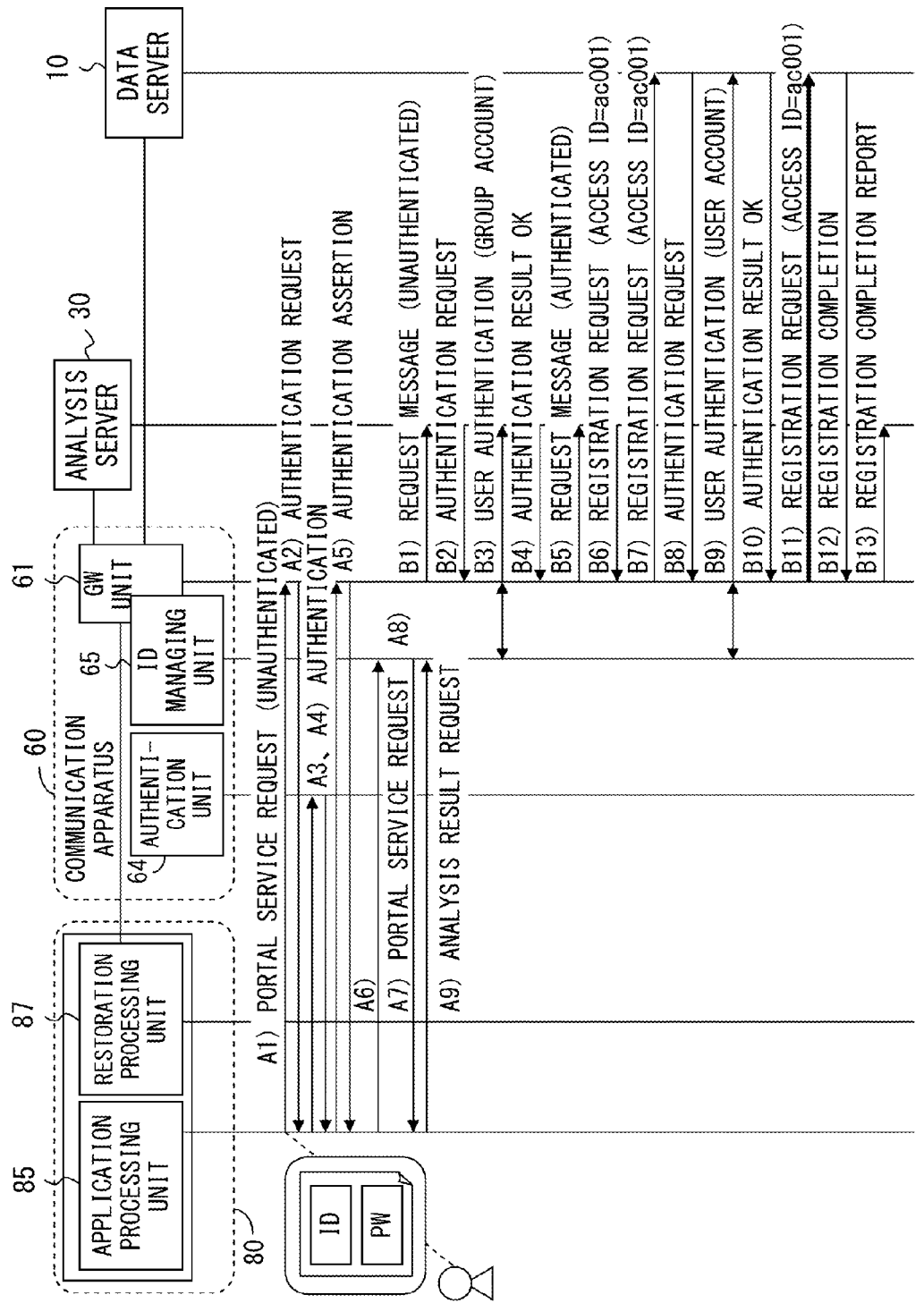
FIG. 12A is a sequence diagram illustrating an example of communication in accordance with a first embodiment.
Figure 12B:
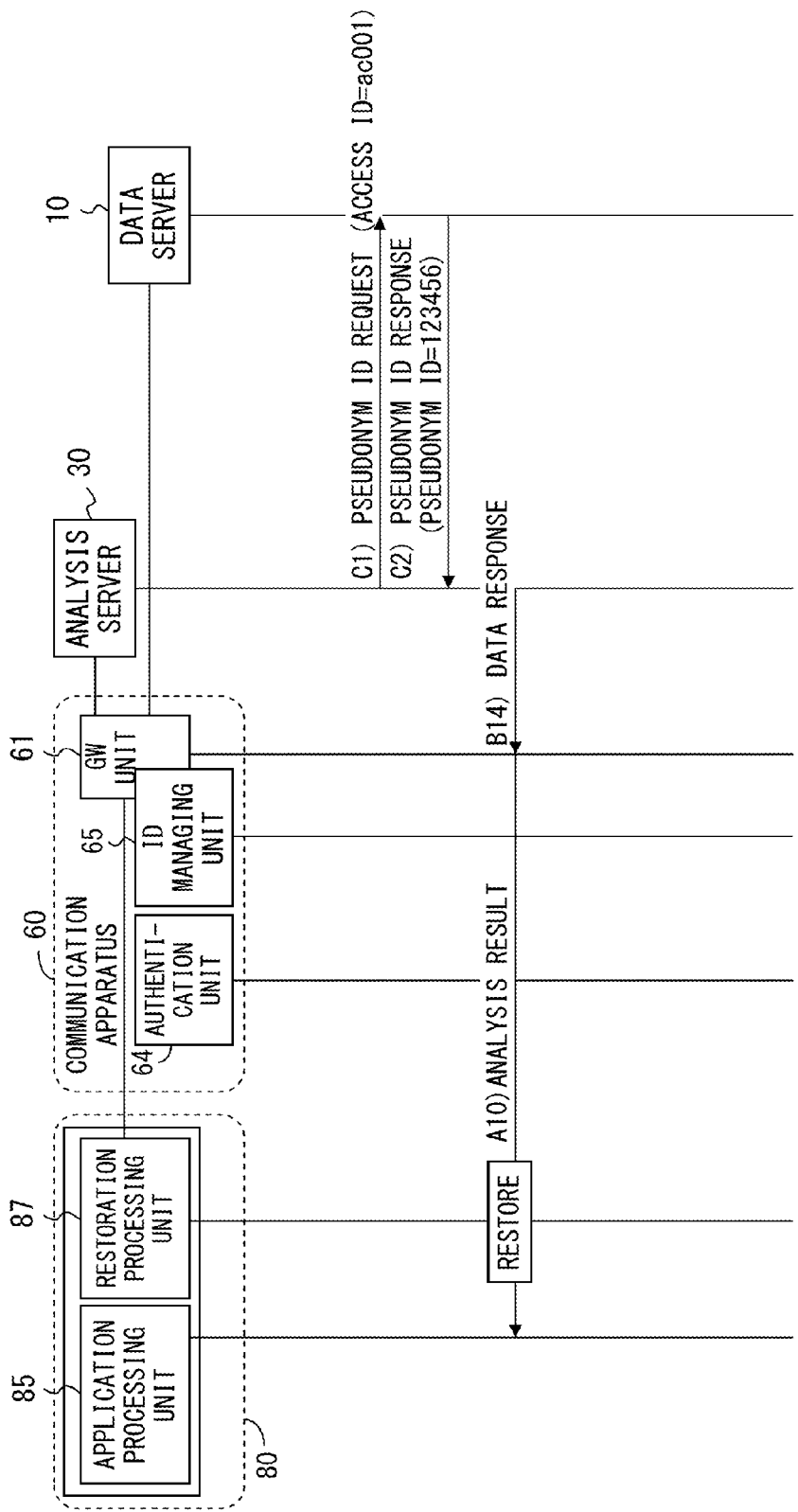
FIG. 12B is a sequence diagram illustrating an example of communication in accordance with the first embodiment.

FIG. 12A and FIG. 12B are sequence diagrams illustrating an example of communication in accordance with the first embodiment. With reference to FIG. 12A and FIG. 12B, descriptions will be given of an example of communication that is performed when a user requests an analysis result from the analysis server 30 after the analysis server 30 finishes an analysis. The following descriptions are based on the assumption that the user is the student having the test result illustrated in FIG. 11A. In the examples of FIG. 12A and FIG. 12B, authentication is performed between the terminal 80 and the communication apparatus 60 using Security Assertion Markup Language (SAML).

(A1) Using the terminal 80, a user makes a request for the communication apparatus 60 to enable a portal site to be accessed (a portal service request), the portal site including a menu that allows an analysis result to be browsed.

(A2) When authentication is requested from the communication apparatus 60, the user enters in the terminal 80 an account and a password to access the communication apparatus 60.

(A3) The terminal 80 transmits the information entered by the user to the communication apparatus 60. Assume that "hanako" and "password1" are transmitted to the communication apparatus 60 respectively as the account and the password.

(A4) The receiver 62 of the communication apparatus 60 outputs an authentication request to the authentication unit 64. When the entered information is identical with any of the combinations of an account and a password stored in advance, the authentication unit 64 allows the terminal 80 to gain access. The authentication unit 64 of the communication apparatus 60 issues an authentication assertion to the terminal 80.

(A5) By transmitting the authentication assertion to the communication apparatus 60, the application processing unit 85 reports to the communication apparatus 60 that authentication has succeeded.

(A6) When the authentication assertion is received, the session managing unit 67 of the communication apparatus 60 allocates a first session ID to the terminal 80 and reports the first session ID to the terminal 80. In this case, Set Cookie header of HyperText Transfer Protocol (HTTP) may be used, for example.

FIG. 13 illustrates an example of updating of information via communication between the terminal 80 and the communication apparatus 60. When a first session ID is generated, the sequence managing unit 68 associates the progress of the procedures of communication between the terminal 80 and the communication apparatus 60 with the first session ID and records this progress in the session management table 73. As an example, assume that the first session ID allocated to communication with the terminal 80 is xxxx001. Accordingly, as of procedure (A6), the sequence managing unit 68 holds a session management table 73a illustrated in FIG. 13.

(A7) By transmitting a portal service request to the communication apparatus 60, the application processing unit 85 makes a request to allow the portal site that includes an analysis-result browsing menu to be accessed. The message that is used to make a request to allow the portal site to be accessed includes the first session ID.

(A8) The communication apparatus 60 transmits to the terminal 80 data that is used to display the portal site. Simultaneously, the authentication unit 64 associates the first session ID with an account reported from the terminal 80 in the performing of authentication in procedure (A3), so as to record in the cooperation table 72 information related to the user who has made a request to allow the portal site to be accessed. As of procedure (A8), the communication apparatus 60 holds a cooperation table 72a illustrated in FIG. 13. An account reported from the terminal 80 to the communication apparatus 60 in the performing of authentication in procedure (A3) may hereinafter be referred to as a "user ID".

Meanwhile, the receiver 82 of the terminal 80 outputs to the application processing unit 85 data received from the communication apparatus 60. Using the input data, the application processing unit 85 displays on the display apparatus 86 the portal site that includes an analysis-result browsing menu.

(A9) The user checks the portal site on the display apparatus 86 and chooses to browse an analysis result using an input apparatus. Accordingly, the application processing unit 85 transmits to the communication apparatus 60 an analysis result request, which indicates a request to allow an analysis result to be browsed. The analysis result request includes the first session ID and the address of the analysis server 30 that holds the analysis result. The session managing unit 67 may recognize an address for which access is requested by the analysis result request. Accordingly, when the communication apparatus 60 receives the analysis result request, the session managing unit 67 updates the cooperation table 72a to the cooperation table 72b illustrated in FIG. 13. The sequence managing unit 68 updates the session management table 73 to the session management table 73b illustrated in FIG. 13.

Next, with reference to (B1) to (B7) in FIG. 12A, descriptions will be given of an example of a process series from a process in which the communication apparatus 60 accesses the analysis server 30 to a process in which an access identifier is reported to the communication apparatus 60.

(B1) The proxy authentication unit 66 obtains from the cooperation table 72b an address for which access has been requested by an analysis result request and determines that an access destination is the analysis server 30. Accordingly, the proxy authentication unit 66 transmits to the analysis server 30 a request message to request an analysis result. In this case, since authentication has not been performed between the communication apparatus 60 and the analysis server 30, the request message does not include a second session ID.

(B2) The authentication unit 34 of the analysis server 30 makes a request for the source of the request message that does not include a second session ID to perform authentication.

(B3) Using the ID management table 71, the proxy authentication unit 66 specifies an account and a password, both of which are used for authentication with the analysis server 30. In this example, the proxy authentication unit 66 searches the ID management table 71 using as keys the user ID and the URL "https://kaisekiservice1.com" of the analysis server 30. The proxy authentication unit 66 specifies the user ID from the cooperation table 72b and the first session ID included in the analysis result request. Accordingly, as information to be used for proxy authentication, the proxy authentication unit 66 obtains a group account and a password, both of which are assigned to the group (F High School) to which the user belongs. The following descriptions will be given on the assumption that the proxy authentication unit 66 has chosen to use group account d001 and password pw001 for proxy authentication by referencing the ID management table 71 (FIG. 8). Using the group account and the password that have been chosen to be used for proxy authentication, the proxy authentication unit 66 transmits to the analysis server 30 an authentication request message to make a request to perform authentication.

(B4) The receiver 32 of the analysis server 30 outputs the authentication request message to the authentication unit 34. When any of the combinations of an account and a password stored in advance are identical with the combination of a group account and a password included in the input information, the authentication unit 34 allows the communication apparatus 60 to be accessed and generates a second session ID. The following descriptions will be given on the assumption that S0001 has been generated as the second session ID.

FIG. 14 illustrates an example of updating of information via authentication between the communication apparatus 60 and the analysis server 30. When authentication at the authentication unit 34 succeeds, the access-identifier generating unit 35 associates the second session ID and the group account with each other and records this second session ID and this group account, as indicated by a pseudonym-ID table 52a in FIG. 14. In addition, the authentication unit 34 reports the second session ID to the communication apparatus 60.

(B5) The receiver 62, which has received a report message that includes the second session ID from the analysis server 30, outputs the received report message to the proxy authentication unit 66 and the session managing unit 67. Upon receipt of the second session ID from the report message, the session managing unit 67 updates the cooperation table 72b (FIG. 13) to the cooperation table 72c (FIG. 14). The proxy authentication unit 66 generates and transmits a request message that includes the second session ID to the analysis server 30 via the transmitter 63.

(B6) By referencing the pseudonym-ID table 52a (FIG. 14), the access-identifier generating unit 35 determines whether an access identifier is associated with the second session ID included in the request message. The second session ID (S0001) included in the received request message is not associated with an access identifier. Accordingly, the access-identifier generating unit 35 determines an access identifier to be associated with the second session ID. The following descriptions will be given on the assumption that the access identifier associated with the second session ID S0001 is ac001.

FIG. 15 illustrates an example of updating of information in reporting of an access identifier from the analysis server 30 to the communication apparatus 60. The access-identifier generating unit 35 determines and records an access identifier in the pseudonym-ID table 52. As an example, the access-identifier generating unit 35 updates the pseudonym-ID table 52a to the pseudonym-ID table 52b. When the access-identifier generating unit 35 determines an access identifier, the access-identifier generating unit 35 reports to the sequence managing unit 37 the combination of the access identifier and the second session ID. Accordingly, the sequence managing unit 37 updates the state table 54, which is used to determine whether the access identifier reported from the access-identifier generating unit 35 is registered in the data server 10. As an example, the access-identifier generating unit 35 may update the state table 54 to a state table such as a state table 54a illustrated in FIG. 15.

In addition, the access-identifier generating unit 35 generates a registration request message to register the access identifier in the data server 10. To generate the registration request message, the access-identifier generating unit 35 references the account table 53 (FIG. 6) so as to specify an address and a URL allocated to the data server 10, i.e., a data server in which the access identifier is to be registered. The following descriptions will be given on the assumption that "https://abc.ed.jp" has been specified as a URL allocated to the data server 10. FIG. 16 illustrates an example of a registration request message. As will be described hereinafter, the registration request message illustrated in FIG. 16 is transmitted from the communication apparatus 60 to the data server 10 using HTTP redirect. The access-identifier generating unit 35 transmits the registration request message that includes the specified address to a communication partner identified by the second session ID.

(B7) The receiver 62, which has received a registration request message, outputs this registration request message to the session managing unit 67. Using the registration request message, the session managing unit 67 updates the cooperation table 72c (FIG. 14) to the cooperation table 72d (FIG. 15). Moreover, the session managing unit 67 transmits the registration request message to the data server 10. As an example, upon receipt of the registration request message illustrated in FIG. 16, the session managing unit 67 transforms this registration request message into a registration request message suitable for the data server 10 and transmits the transformed registration request message to the data server 10 via the transmitter 63.

(B8) The receiver 12 of the data server 10, which has received the registration request message, outputs this registration request message to the authentication unit 15. The authentication unit 15 determines whether the registration request message includes a third session ID. When a third session ID is not included, the authentication unit 15 makes a request for the source of the registration request message to perform authentication. Since authentication has not been performed between the communication apparatus 60 and the data server 10, the authentication unit 15 transmits an authentication request message to the communication apparatus 60 via the transmitter 13. In this case, the authentication unit 15 incorporates the access identifier included in the registration request message into the authentication request message. Accordingly, in this case, the authentication request message that includes access identifier ac001 is transmitted to the communication apparatus 60.

(B9) The receiver 62 of the communication apparatus 60 outputs the authentication request message to the proxy authentication unit 66. Using the access identifier included in the authentication request message as a key, the proxy authentication unit 66 searches the cooperation table 72d (FIG. 15). In accordance with the cooperation table 72d, the requested authentication is judged to be directed to access https://abc.ed.jp, which relates to a user ID "hanako". Accordingly, the proxy authentication unit 66 searches the ID management table 71 using the user ID and the access destination as keys so as to specify an account and a password, both of which are used for authentication. The ID management table 71 records a user account determined for each user as an account for making a request for the data server 10 to perform authentication. Thus, the user account is used for authentication from the communication apparatus 60 to the data server 10. As an example, in the case of the ID management table 71 illustrated in FIG. 8, the account used for authentication is 986012, and the password is pwxxx. Using the account and the password specified using the ID management table 71, the proxy authentication unit 66 makes a request for the data server 10 to perform authentication.

(B10) The receiver 12 of the data server 10 outputs to the authentication unit 15 the authentication request from the communication apparatus 60. When an authentication request is input that includes the combination of an account and a password which are both identical with any of the combinations of a user account and a password stored in advance, the authentication unit 15 allows access from the communication apparatus 60. In addition, the authentication unit 15 outputs to the session managing unit 16 the user account of a user who has been newly successfully authenticated. The session managing unit 16 generates a third session ID for the user account reported from the authentication unit 15. Moreover, using the pseudonym-ID table 21, the session managing unit 16 associates the newly generated third session ID with a pseudonym ID so as to generate a session management table 22. As an example, assume that the third session ID zzzzzzz is allocated to access from account 986012. Accordingly, the session managing unit 16 generates a session management table 22a illustrated in FIG. 17. The session managing unit 16 reports to the communication apparatus 60 the success of authentication and the third session ID.

(B11) The receiver 62, which has received a message reporting the success of authentication, outputs this message to the session managing unit 67. The session managing unit 67 processes the input message so as to update the cooperation table 72d (FIG. 15) to a cooperation table 72e (FIG. 17). The session managing unit 67 generates a registration request message that includes access identifier ac001 and the third session ID. The registration request message is transmitted to the data server 10 via the transmitter 63.

(B12) Upon receipt of the registration request message that includes the third session ID, the receiver 12 outputs this received message to the session managing unit 16. Using as a key the third session ID included in the input registration request message, the session managing unit 16 searches the session management table 22. The session managing unit 16 associates the access identifier reported by the registration request message with an entry that has been hit and then registers this access identifier. Through this process, as an example, the session management table 22*a* illustrated in FIG. 17 is updated to the session management table 22*b*. When the updating of the session management table 22 ends, the session managing unit 16 generates a registration completion message to report the completion of registering of the access identifier to the communication apparatus 60 and transmits this message to the communication apparatus 60 via the transmitter 13. The registration completion message includes the access identifier that has been registered.

(B13) Upon receipt of the registration completion message, the receiver 62 outputs this message to the session managing unit 67. For the access identifier included in the registration completion message, the session managing unit 67 generates a message that reports to the analysis server that the registering has been completed (a registration-completion report message). Moreover, using the cooperation table 72*e* illustrated in FIG. 17, the session managing unit 67 specifies the second session ID and the address allocated to the analysis server 30.

(C1) With reference to FIG. 12B and FIG. 18, descriptions will be given of an example of updating of information after an access identifier is registered in the data server 10. Upon receipt of a registration-completion report message from the communication apparatus 60, the receiver 32 of the analysis server 30 outputs this message to the access-identifier generating unit 35 and the sequence managing unit 37. Using the registration-completion report message, the sequence managing unit 37 updates the state table 54*a* (FIG. 15) to the state table 54*b* (FIG. 18). The access-identifier generating unit 35 generates a message to request a pseudonym ID associated with the access identifier for which registration completion has been reported (pseudonym-ID request message). In the generating of the pseudonym-ID request message, the access-identifier generating unit 35 references the pseudonym-ID table 52 so as to obtain a group account associated with an access identifier for which reporting has been completed. As an example, the access-identifier generating unit 35 references the pseudonym-ID table 52*b* (FIG. 15) so as to obtain group account d001. The access-identifier generating unit 35 obtains the address of the data server 10 by searching the account table 53 using the obtained group account as a key. The access-identifier generating unit 35 transmits the pseudonym-ID request message to the data server 10.

(C2) The receiver 12 of the data server 10 outputs the pseudonym-ID request message to the session managing unit 16. The session managing unit 16 specifies a requested pseudonym ID by referencing the session management table 22. When, for example, a pseudonym ID associated with access identifier ac001 is requested, the session managing unit 16 reports pseudonym ID=123456 to the analysis server 30 according to the session management table 22*b* (FIG. 17).

When the pseudonym ID is reported from the data server 10, the receiver 32 outputs the report on the pseudonym ID to the access-identifier generating unit 35 and the output unit 42. Using the input information, the access-identifier generating unit 35 updates the pseudonym-ID table 52*b* (FIG. 15) to the pseudonym-ID table 52*c* (FIG. 18).

(B14) The output unit 42 generates and outputs to the transmitter 33 a packet that includes an analysis result associated with the pseudonym ID reported from the data server 10. The transmitter 33 transmits the packet that includes the analysis result to the communication apparatus 60 as a response to procedure (B13). Assume that the analysis result has been encrypted. As an example, for pseudonym ID=123456, the output unit 42 outputs the analysis result illustrated in FIG. 11C to the communication apparatus 60.

(A10) Upon receipt of the packet that includes the analysis result from the analysis server 30, the receiver 62 outputs this packet to the session managing unit 67. The session managing unit 67 transmits information included in the input packet to the terminal 80 via the transmitter 63. The session managing unit 67 may use information from the cooperation table 72 in order to specify the terminal 80. The packet that includes the analysis result is transmitted to the terminal 80 as a response to procedure (A9). During procedures (A9) to (A10), the communication between the communication apparatus 60 and the terminal 80 continues using, for example, keep-alive. The terminal 80 properly decodes data transmitted from the communication apparatus 60. The application processing unit 85 may display the analysis result on the display apparatus 86.

Figure 19A:
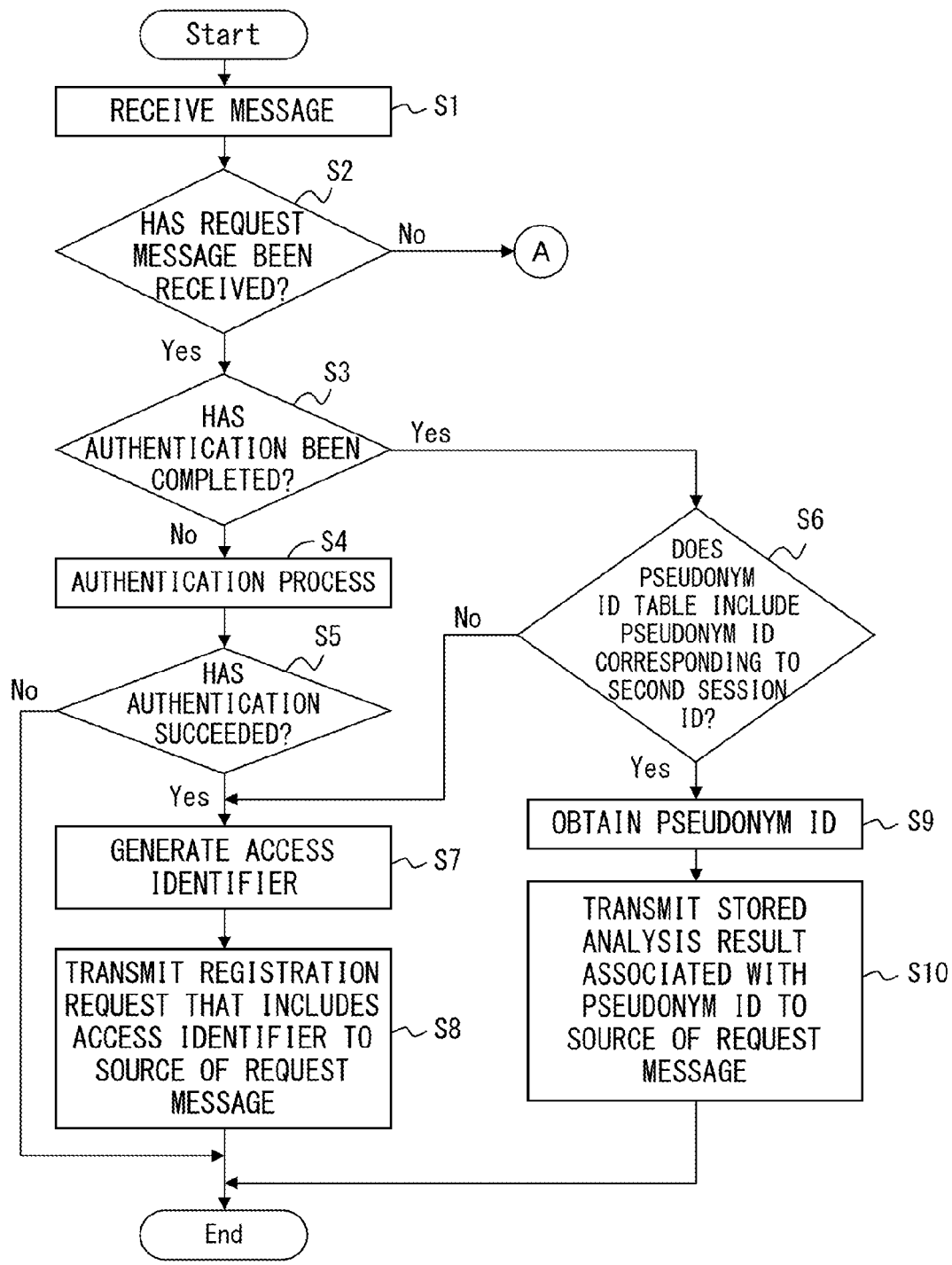
FIG. 19A and FIG. 19B are flowcharts illustrating exemplary operations of an analysis server.
Figure 19B:
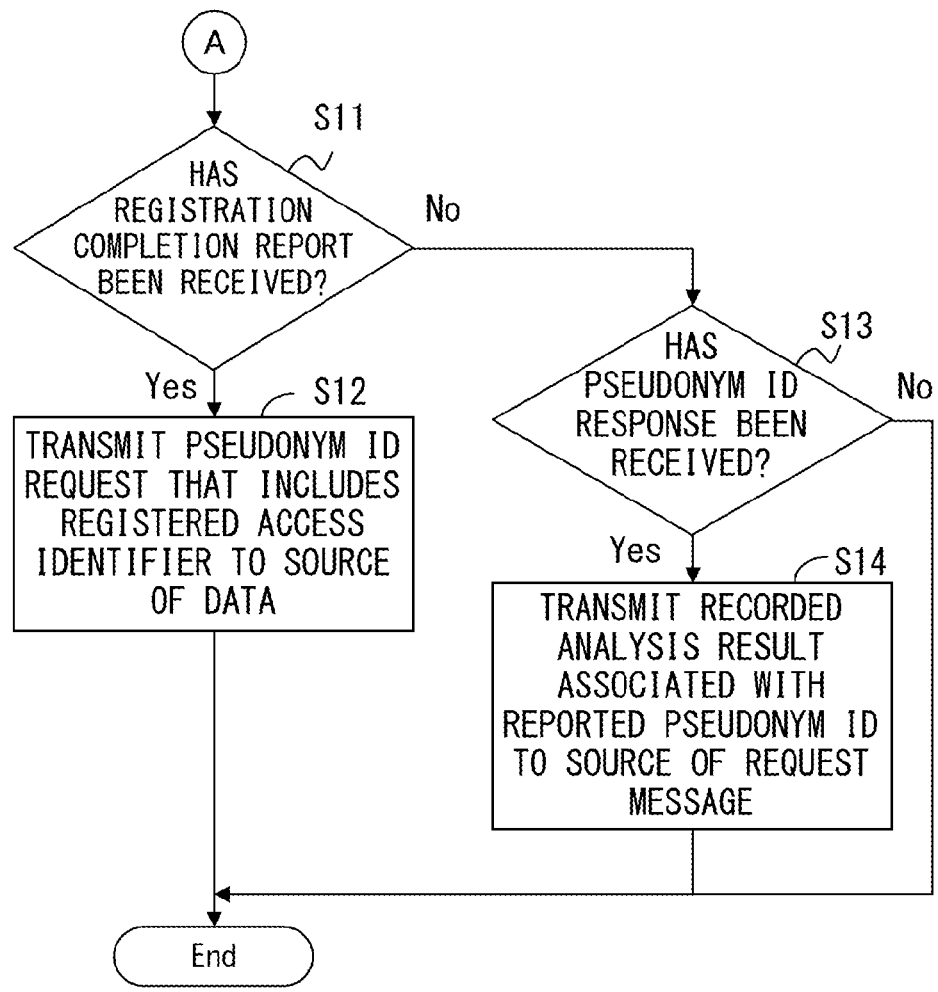

FIG. 19A and FIG. 19B are flowcharts illustrating exemplary operations of the analysis server 30. Upon receipt of a message, the receiver 32 outputs this received message to the access-identifier generating unit 35 (step S1). The access-identifier generating unit 35 determines whether the input message is a request message (step S2). When the access-identifier generating unit 35 determines that a request message has been received, the access-identifier generating unit 35 determines whether authentication with a source of the request message has been finished (step S3). As an example, the access-identifier generating unit 35 determines that authentication has been finished when the request message includes the second session ID, and determines that authentication has not been finished when a second session ID is not included. When the access-identifier generating unit 35 determines that authentication has not been finished, the access-identifier generating unit 35 makes a request for the authentication unit 34 to perform an authentication process, and the authentication unit 34 performs authentication with the source of the request message (No in step S3; step S4). When authentication between the communication apparatus 60 and the analysis server 30 succeeds, the access-identifier generating unit 35 allocates an access identifier to the communication apparatus 60 (Yes in step S5; step S7). In addition, the access-identifier generating unit 35 associates the allocated access identifier with a second session ID associated with the communication apparatus 60 and then records this access identifier in the pseudonym-ID table 52. The access-identifier generating unit 35 transmits the registration request that includes the access identifier to the source of the request message via the transmitter 33 (step S8). For the communication apparatus that is not successfully authenticated, the access-identifier generating unit 35 terminates the process without generating an access identifier (No in step S5).

When the communication apparatus 60 that has been authenticated is the source of the service request message, the access-identifier generating unit 35 extracts the second session ID from the request message (Yes in step S3). In addition, the access-identifier generating unit 35 determines whether the pseudonym-ID table 52 has recorded therein a pseudonym ID associated with the extracted second session ID (step S6). When the pseudonym-ID table 52 does not have recorded therein a pseudonym ID associated with the second session ID, the access-identifier generating unit 35 performs the processes of step S7 and the following steps (No in step S6). When the pseudonym-ID table 52 has recorded therein a pseudonym ID associated with the second session ID, the access-identifier generating unit 35 obtains the pseudonym ID associated with the second session ID (Yes in step S6; step S9). Moreover, the access-identifier generating unit 35 outputs the obtained pseudonym ID to the output unit 42. The output unit 42 generates a packet to transmit to the source of the request message a stored analysis result associated with the pseudonym ID input from the access-identifier generating unit 35, and transmits this packet to the communication apparatus 60 (step S10).

When the input message is also not a request message, the access-identifier generating unit 35 determines whether a registration-completion report message has been input (step S11). When the input message is a registration-completion report message, the access-identifier generating unit 35 transmits a pseudonym-ID request message to the data server 10, which is a source of data to be analyzed (Yes in step S11; step S12).

Meanwhile, when the input message is also not a registration-completion report message, the access-identifier generating unit 35 determines whether a pseudonym-ID response message has been input (No in step S11; step S13). When the input message is a pseudonym-ID response message, the access-identifier generating unit 35 extracts and reports a reported pseudonym ID to the output unit 42 (Yes in step S13). The output unit 42 generates a packet to transmit to the source of the request message a stored analysis result associated with the pseudonym ID input from the access-identifier generating unit 35, and transmits this packet to the communication apparatus 60 (step S14). When the input message is not a request message, a registration-completion report message, or a pseudonym-ID response message, the access-identifier generating unit 35 terminates the process (No in step S13).

Figure 20A:
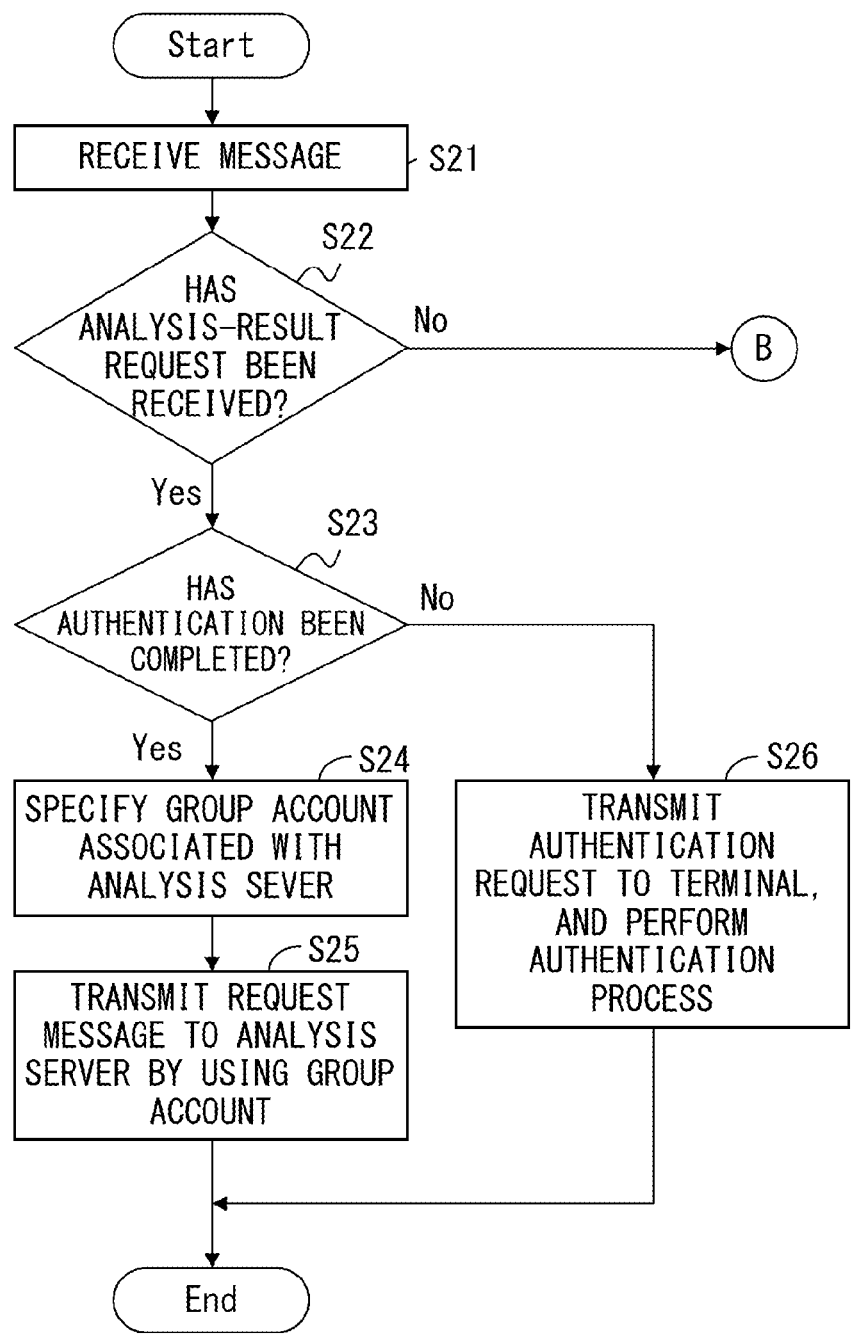
FIG. 20A to FIG. 20C are flowcharts illustrating exemplary operations of a communication apparatus.
Figure 20B:
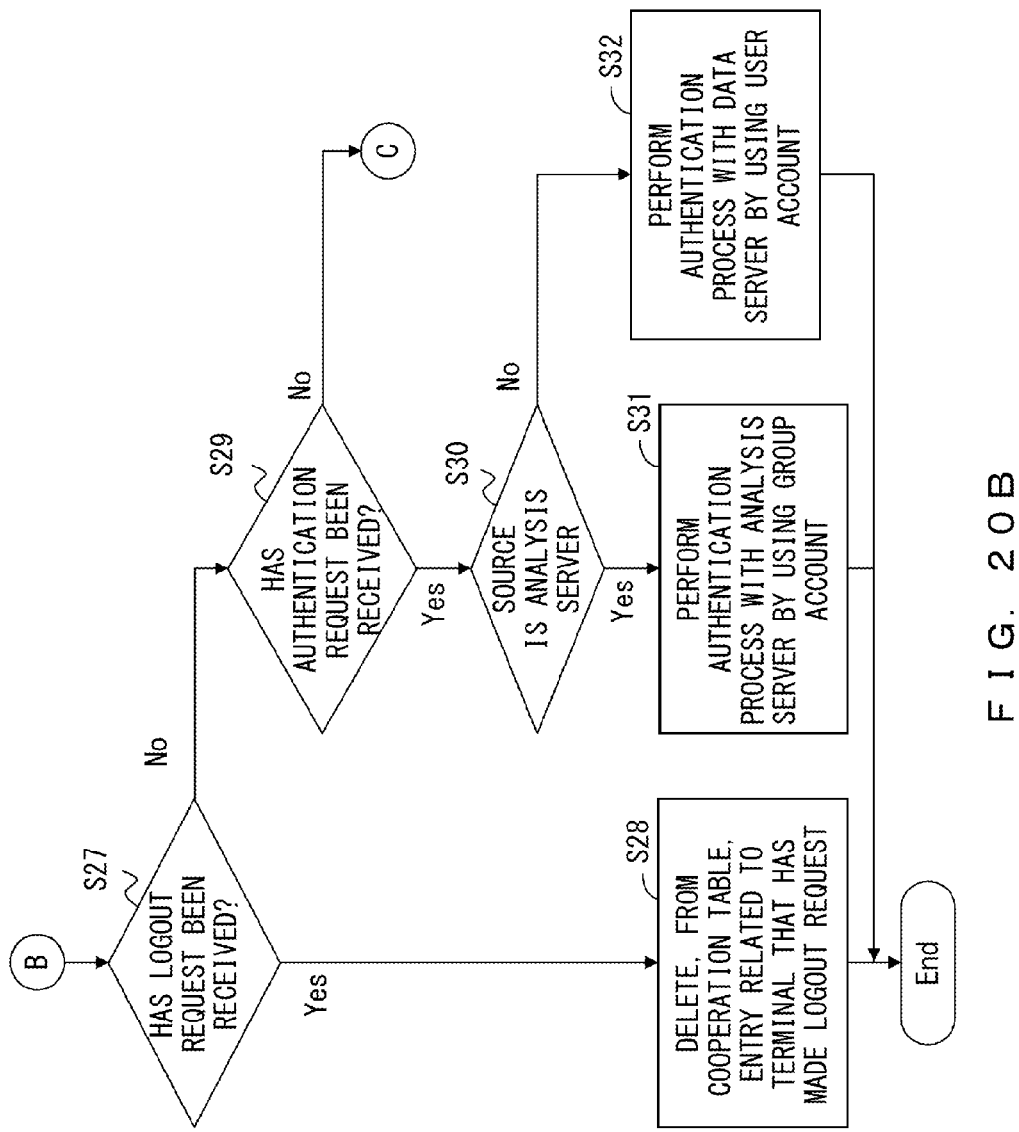
Figure 20C:
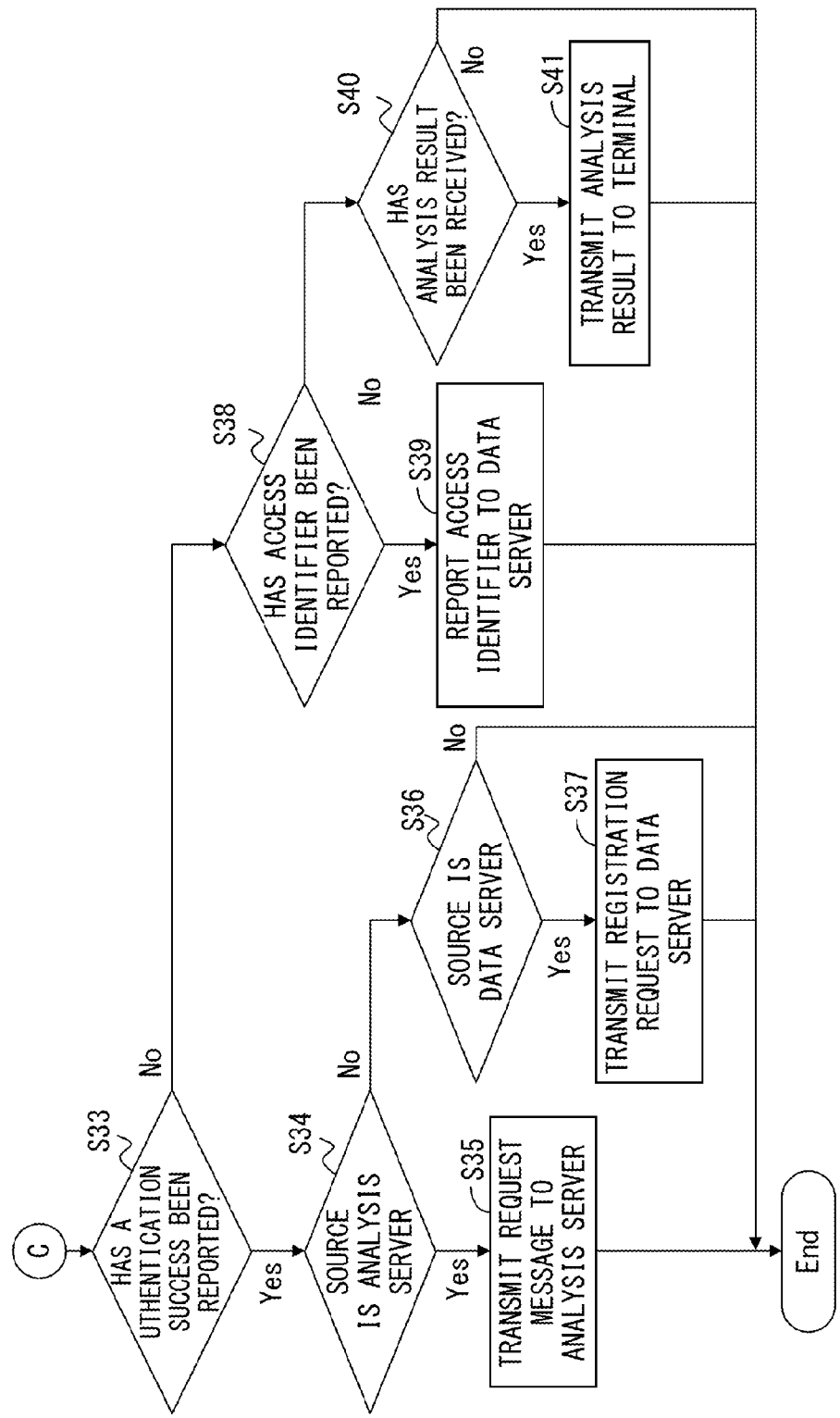

FIG. 20A to FIG. 20C are flowcharts illustrating exemplary operations of the communication apparatus 60. The receiver 62 receives a message (step S21). When the receiver 62 receives an analysis result request from the terminal 80, the receiver 62 outputs this analysis result request to the authentication unit 64 (Yes in step S22). The authentication unit 64 determines whether the analysis result request has been requested from the authenticated terminal 80 (step S23). When the source of the analysis result request is the authenticated terminal 80, the authentication unit 64 outputs the analysis result request to the session managing unit 67. By referencing the ID management table 71, the session managing unit 67 specifies a group account that is used to access the analysis server 30. In this case, the session managing unit 67 searches the ID management table 71 by using as keys the user ID associated with the terminal 80 and the URL of the analysis server 30 reported by the analysis result request (Yes in step S23; step S24). The session managing unit 67 uses the group account so as to generate a request message addressed to the analysis server 30, and transmits this request message to the analysis server 30 via the transmitter 63 (step S25). Meanwhile, determining that the analysis result request has been received from the terminal 80 that has not been authenticated in step S23, the authentication unit 64 makes a request for the terminal 80 to perform authentication and performs an authentication process with the terminal 80 (step S26).

When the received message is not an analysis result request, the receiver 62 determines whether the terminal 80 has made a request to log out the terminal 80 (No in step S22; step S27). When the terminal 80 has made a request to log out the terminal 80, the receiver 62 outputs the received message to the session managing unit 67 (Yes in step S27). The session managing unit 67 deletes from the cooperation table 72 an entry that includes a first session ID reported from the terminal 80 that has made a request to log out the terminal 80 (step S28).

When the receiver 62 determines in step S27 that the terminal 80 has not made a request to log out the terminal 80, the receiver 62 determines whether an authentication request has been received (step S29). When the receiver 62 determines that the authentication request has been received, the receiver 62 outputs the authentication request to the proxy authentication unit 66. The proxy authentication unit 66 determines whether the source of the authentication request is the analysis server 30 (step S30). When the analysis server 30 has requested authentication, the proxy authentication unit 66 performs an authentication process with the analysis server 30 using a group account and a password associated with the group account (step S31). Meanwhile, when the analysis server 30 has not requested authentication, the proxy authentication unit 66 determines that the authentication request has been received from the data server 10. Accordingly, the proxy authentication unit 66 performs an authentication process with the data server 10 using the user account that is used for communication with the data server 10 and a password associated with the user account (step S32).

Meanwhile, when the receiver 62 determines in step S29 that an authentication request has not been reported, the receiver 62 determines whether the success of authentication has been reported (step S33). When the success of authentication has been reported, the receiver 62 outputs the received message to the session managing unit 67. The session managing unit 67 determines whether the source of the report of an authentication success is the analysis server 30 (step S34). When the source is the analysis server 30, the session managing unit 67 transmits a request message to the analysis server 30 (Yes in step S34; step S35). When the source of the report of an authentication success is not the analysis server 30, the session managing unit 67 determines whether the source is the data server 10 (No in step S34; step S36). When the source is the data server 10, the session managing unit 67 transmits to the data server 10 a request to register an access identifier (Yes in step S36; step S37). When the source of the report of an authentication success is neither the analysis server 30 nor the data server 10, the session managing unit 67 terminates the process (No in step S36).

When the receiver 62 determines in step S33 that an authentication success has not been reported, the receiver 62 determines whether a report of an access identifier has been received (step S38). When the report of an access identifier is received, the receiver 62 outputs the received message to the session managing unit 67. Assume that the report of an access identifier is a redirect message that designates the data server 10 as a redirect destination. The session managing unit 67 uses the redirect message so as to generate an HTTP message that is addressed to the data server 10 and that includes the access identifier, and transmits this HTTP message via the transmitter 63 (Yes in step S38; step S39).

Meanwhile, when the receiver 62 determines in step S38 that the received message is also not a report of an access identifier, the receiver 62 determines whether an analysis result has been reported from the analysis server 30 (step S40). When an analysis result has been received from the analysis server 30, the receiver 62 outputs the received message to the session managing unit 67. The session managing unit 67 transmits the analysis result via the transmitter 63 to the terminal 80 of the user who has transmitted an analysis-result request (Yes in step S40; step S41). When the receiver 62 determines in step S40 that an analysis result has not been received, the receiver 62 terminates the process.

As described above, the method in accordance with the first embodiment allows the communication apparatus 60 to request an analysis result from the analysis server 30 even without obtaining a pseudonym ID of a user who has requested the analysis result. Thus, the analysis result is not transmitted from the analysis server 30 to the data server 10, and the analysis result is not transmitted from the data server 10 to the terminal 80, either. Accordingly, the load on the data server 10 is decreased, and traffic within the network is reduced. A pseudonym ID is reported from the data server 10 to the analysis server 30 but is not reported to the communication apparatus 60 or the terminal 80. So, pseudonym IDs become highly confidential. In addition, data that is to be concealed, such as personal information of a user who uses the terminal 80, is not transmitted from the communication apparatus 60 to the analysis server 30 and, in addition, is not transmitted from the data server 10. Accordingly, there is no risk of leakage of, for example, personal information even if the analysis server 30 is administered by a third party having nothing to do with a user of the terminal 80 or an administrator of the data server 10.

Second Embodiment

For a second embodiment, descriptions will be given of a situation in which an analysis server does not generate an access identifier in response to a user's request to provide an analysis result but a data server 10 issues a provisional token. The provisional token is an identifier that can be effectively used during one login in order to uniquely identify a pseudonym ID. In this case, the analysis server may generate a message that includes identification information to identify a request message.

Figure 21:
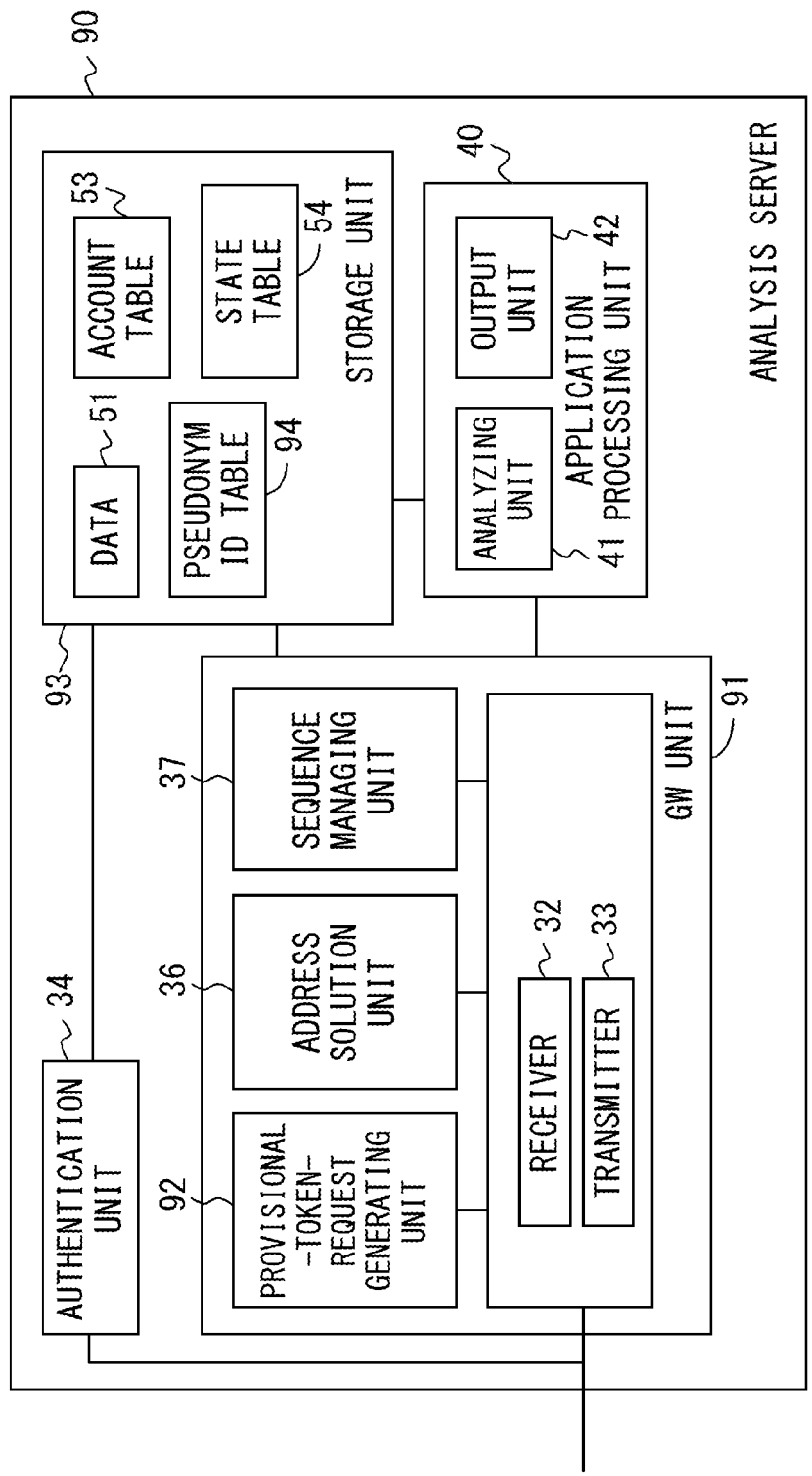
FIG. 21 illustrates an exemplary configuration of an analysis server.

FIG. 21 illustrates an exemplary configuration of an analysis server 90 that is used in the second embodiment. The analysis server 90 includes a gateway unit 91, an authentication unit 34, an application processing unit 40, and a storage unit 93. The gateway unit 91 includes a provisional-token-request generating unit 92. Upon receipt of a request message from a communication apparatus 60, the provisional-token-request generating unit 92 generates a provisional-token request message. The storage unit 93 holds pseudonym-ID tables 94. As illustrated in FIG. 22, the pseudonym-ID tables 94 (94*a*, 94*b*) associate a second session ID, a group account, a provisional token, and a pseudonym ID with each other.

In addition to the provisional-token-request generating unit 92, the gateway unit 91 includes a receiver 32, a transmitter 33, an address solution unit 36, and a sequence managing unit 37. In addition to the pseudonym-ID tables 94, the storage unit 93 holds data 51, an account table 53, and a state table 54. The receiver 32, the transmitter 33, the address solution unit 36, the sequence managing unit 37, the authentication unit 34, the application processing unit 40, the data 51, the account table 53, and the state table 54 are similar to those in the first embodiment.

Figure 23A:
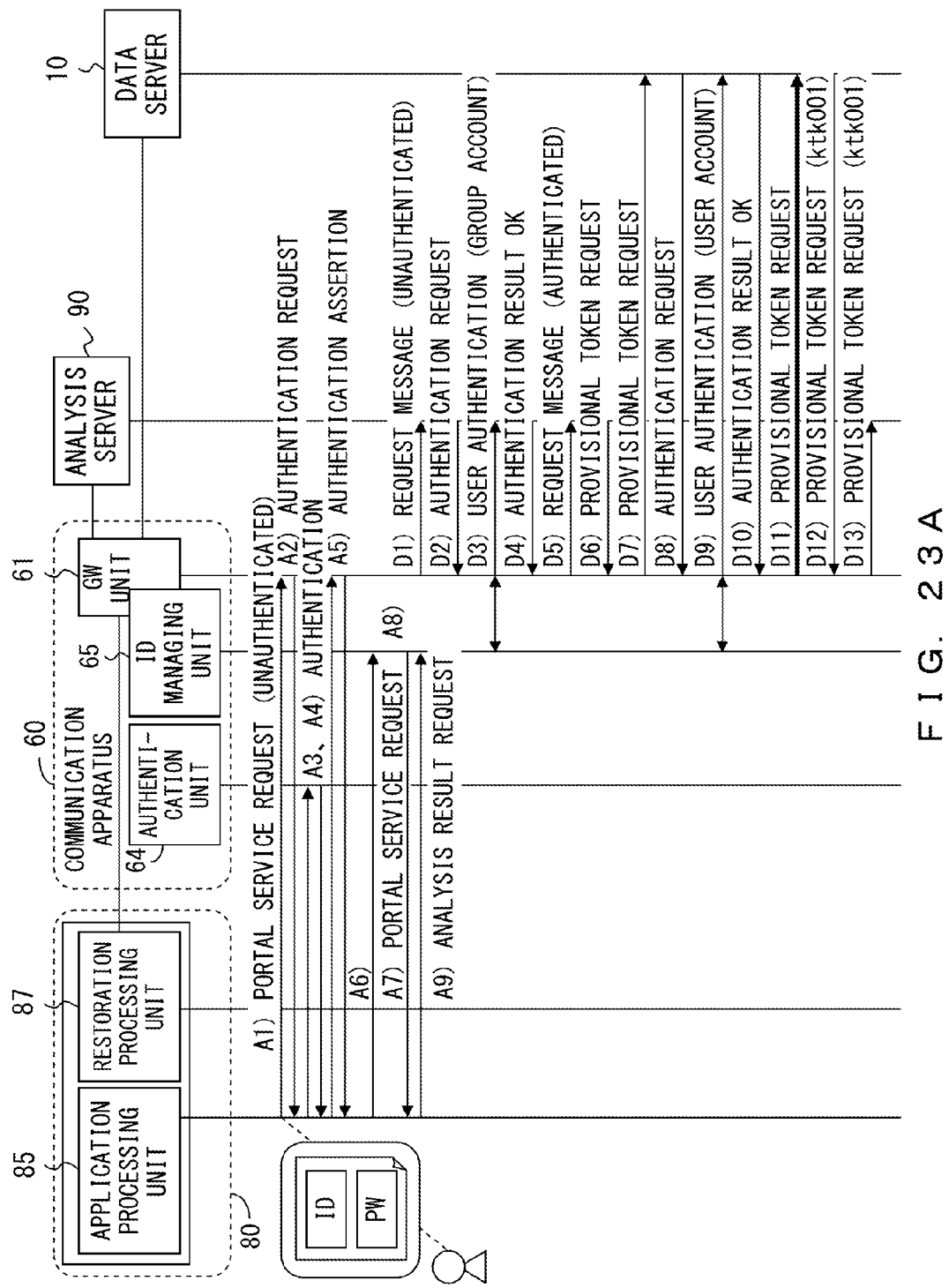
FIG. 23A is a sequence diagram illustrating an example of communication performed in the second embodiment.
Figure 23B:
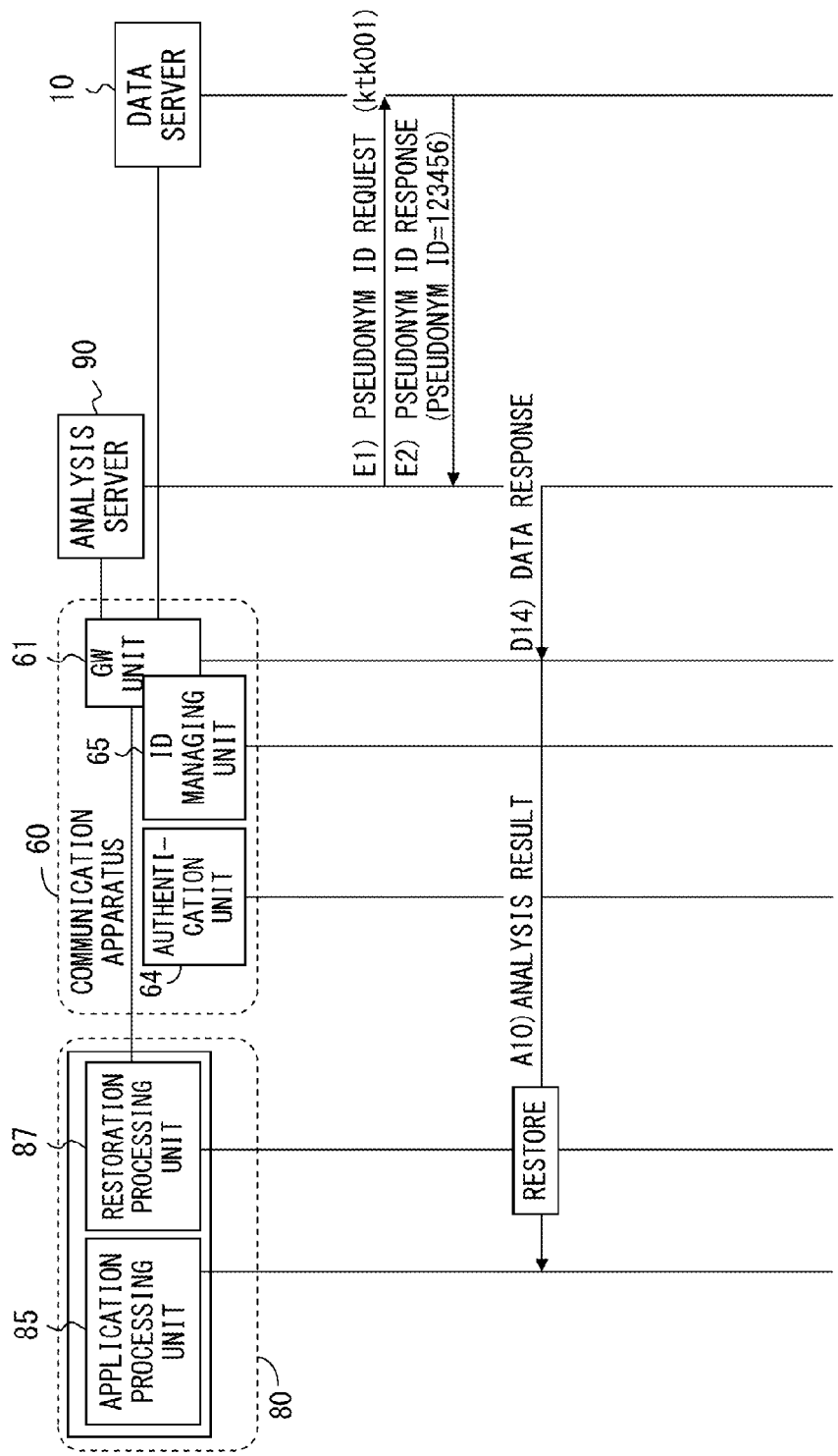
FIG. 23B is a sequence diagram illustrating an example of communication performed in the second embodiment.

FIG. 23A and FIG. 23B are sequence diagrams illustrating an example of communication performed in the second embodiment. In the second embodiment, the communication performed between the communication apparatus 60 and the terminal 80 is similar to that performed in the first embodiment.

For the communication apparatus 60 and the analysis server 90, processes using procedures (D1) to (D14) are performed. Procedures (D1) to (D5) are similar to procedures (B1) to (B5), which were described with reference to FIG. 12A.

(D6) The provisional-token-request generating unit 92 references the pseudonym-ID table 94 so as to determine whether a provisional token is associated with a second session ID included in a request message. The following descriptions will be given on the assumption that the second session ID included in the received request message is S0001 and that the analysis server 90 holds the pseudonym-ID table 94*a*. Accordingly, since the second session ID included in the request message is not associated with a provisional token, the provisional-token-request generating unit 92 generates a provisional-token request message.

Figure 24A:
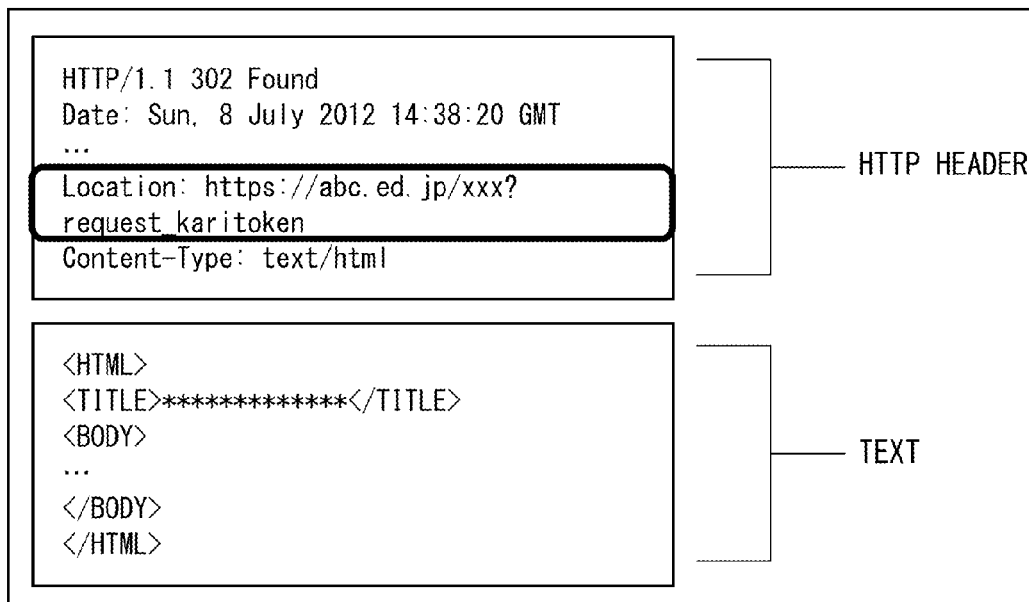
FIG. 24A illustrates an example of a message used in the second embodiment.
Figure 24B:
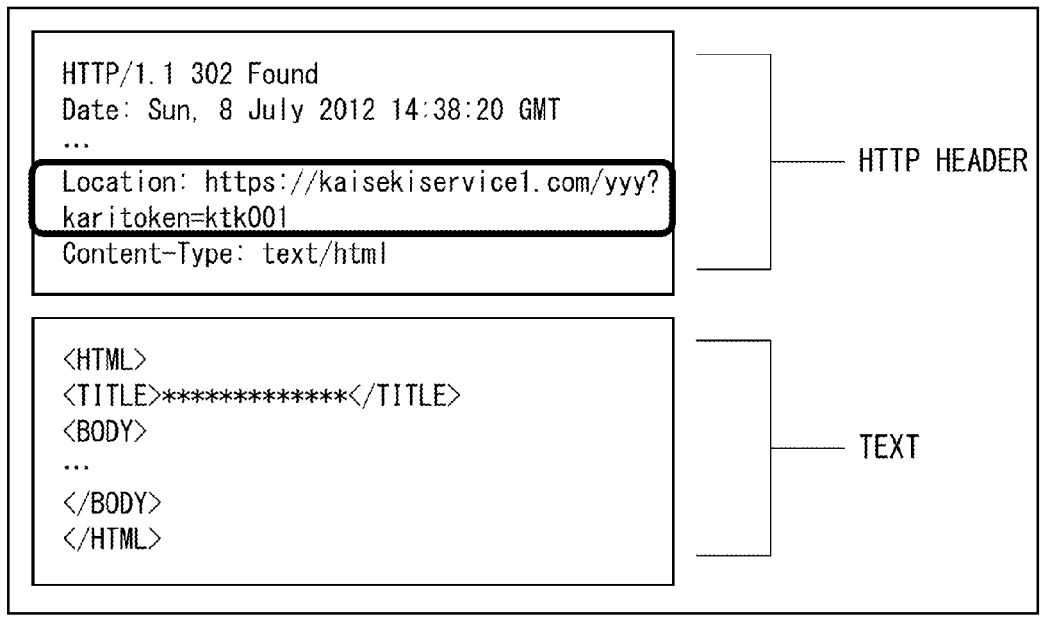
FIG. 24B illustrates an example of a message used in the second embodiment.

FIG. 24A and FIG. 24B illustrate an example of messages used in the second embodiment. The provisional-token-request generating unit 92 may generate, for example, a message illustrated in FIG. 24A as a provisional-token request message. The provisional-token request message includes an address of the data server 10.

A method used by the analysis server 90 for specifying a URL of the data server 10 is similar to the method used by the analysis server 30 in the first embodiment for specifying the URL of the data server 10. FIG. 24A depicts an example, so an information element within a provisional-token message may be changed in accordance with an implementation by, for example, incorporating a second session ID in a provisional-token request message.

(D7) The receiver 62 of the communication apparatus 60 outputs the provisional-token request message to the session managing unit 67. In accordance with HTTP redirect, the session managing unit 67 transmits the provisional-token request message to the data server 10.

In addition, using the provisional-token request message, the session managing unit 67 updates an entry of information of a cooperation table 72 that relates to the user who has requested the analysis result by using the request message that has caused the provisional-token request message to be generated. As an example, for a user with a user ID of "hanako", the session managing unit 67 updates the entry as illustrated in a cooperation table 72*f* illustrated in FIG. 22. By utilizing a situation in which the provisional-token request message is transmitted as a message to respond to the request message, the session managing unit 67 uniquely specifies the request message that has caused the provisional-token request message to be generated. When a second session ID is included in the provisional-token request message, the session managing unit 67 may use the second session ID so as to select an entry to be updated from the cooperation table 72.

Procedures (D8) to (D10) are similar to procedures (B8) to (B10), which were described with reference to FIG. 12A.

(D11) The receiver 62, which has received a message reporting that authentication has succeeded, outputs this message to the session managing unit 67. The session managing unit 67 generates and outputs to the transmitter 63 a provisional-token request message that includes a third session ID reported from the data server 10 and information of the analysis server 90. The information of the analysis server 90 is arbitrary information with which the data server can uniquely specify the analysis server 90. The information of the analysis server 90 includes, for example, a URL of a service to allow an analysis result provided by the analysis server 90 to be browsed and an identifier determined upon conclusion of a contract for analysis results between the data server 10 and the analysis server 90.

(D12) Upon receipt of the provisional-token request message that includes a third session ID, the receiver 12 outputs this received message to the session managing unit 16. The session managing unit 16 searches the session management table 22 using as a key the third session ID included in the input message. Moreover, the session managing unit 16 generates and records in the session management table 22 a provisional token corresponding to an entry that has been hit. Accordingly, a session management table 22c illustrated in FIG. 22 is generated.

When a provisional token is generated, the session managing unit 16 generates a provisional-token report message to report the provisional token to the communication apparatus 60, and transmits this generated provisional-token report message to the communication apparatus 60 via the transmitter 13. An exemplary provisional-token report message is depicted in FIG. 24B. In the example illustrated in FIG. 24B, the provisional-token report message is a redirect message that indicates the analysis server 90 as a redirect destination.

(D13) Upon receipt of the provisional-token report message, the receiver 62 outputs this message to the session managing unit 67. The session managing unit 67 rewrites a destination of the provisional-token report message and then transmits the provisional-token report message to the analysis server 90 via the transmitter 63. Moreover, using the provisional-token report message, the session managing unit 67 updates the cooperation table to a table such as a cooperation table 72g (FIG. 22).

(E1) The receiver 32 of the analysis server 90 outputs the provisional-token report message to the provisional-token-request generating unit 92. The provisional-token-request generating unit 92 generates and outputs to the transmitter 33 a message to ask about a pseudonym ID that corresponds to the provisional token included in the provisional-token report message (a pseudonym request message). The transmitter 33 transmits the pseudonym request message to the data server 10.

(E2) The receiver 12 of the data server 10 outputs the pseudonym request message to the session managing unit 16. The session managing unit 16 specifies the requested pseudonym ID by referencing the session management table 22. As an example, when the pseudonym ID associated with pseudonym token ktk001 is requested, the session managing unit 16 reports pseudonym ID=123456 to the analysis server 90 according to the session management table 22c.

When the pseudonym ID is reported from the data server 10, the receiver 32 outputs the report of the pseudonym ID to the provisional-token-request generating unit 92 and the output unit 42. Using the input information, the provisional-token-request generating unit 92 updates the pseudonym-ID table 94a to the pseudonym-ID table 94b.

Procedure (D14) is similar to procedure (B14), which was described with reference to FIG. 12A.

In the method in accordance with the second embodiment, the analysis server 90 does not generate an access identifier but a provisional token is used that is generated by the data server 10. Thus, the processing burden on the analysis server 90 may be decreased. Pseudonym IDs are not reported to the communication apparatus 60 or the terminal 80 and thus become highly confidential. In addition, personal information of a user who uses the terminal 80 or the like is not provided to the analysis server 90. Also, in the method in accordance with the second embodiment, an analysis result is not transmitted from the analysis server 90 to the data server 10 or from the data server 10 to the terminal 80. Thus, the load on the data server 10 may be decreased.

Others

The embodiments are not limited to those described above, and various variations are possible. Some of the variations will be described in the following.

(1) Application to Systems that use Cloud Computing

Embodiments, Including the First and Second embodiments described above, are applicable to a system that uses cloud computing. The system that uses cloud computing is suitable for analysis of a large amount of data, i.e., so-called big data, that is complicated. For the system that uses cloud computing, the terminal 80 is, for example, a computer or a smartphone used by individual users. Meanwhile, the data server 10 is a server within a private cloud administered by a group to which the user belongs. Moreover, the communication apparatus 60 is a server that provides a portal site to allow the user to access the data server 10 and that can perform a proxy authentication process for the user.

In such a system, data obtained from individual users is held in the data server 10 within the private cloud, and substituted data is generated by the data server 10. The data server 10 makes a request for the analysis server 30 to perform analysis by transmitting the substituted data to the analysis server 30. When data analysis ends, each user accesses the analysis server 30 via the communication apparatus 60. Using the method described with reference to the first or second embodiment, the analysis server 30 obtains a pseudonym ID and transmits the requested analysis result to the communication apparatus 60. Simultaneously, the analysis server 30 saves the analysis result transmitted to the communication apparatus 60. The analysis result is transmitted from the communication apparatus 60 to the terminal 80 so that the user can browse the analysis result using the terminal 80. This is also true for a situation in which the analysis server 90 is used instead of the analysis server 30.

Accordingly, applying the aforementioned embodiment to a system that uses cloud computing hinders leakage of a pseudonym ID since the pseudonym ID is not reported to the communication apparatus 60 or the terminal 80. Concealed information that includes, for example, personal information of each user is not transmitted from a private cloud to outside. In addition, a vast amount of data does not need to be saved in the data server 10, so that the burden on the data server 10 can be decreased.

(2) Other Variations

A group identifier may be arbitrary information that allows the analysis server 30 to uniquely identify a group. For example, a group account, a session ID issued by authentication using the group account, and so on are used as the group identifier. Similarly, a user identifier may be arbitrary information that allows the data server 10 to uniquely identify a user. For example, a user account, a session ID issued by authentication using the user account, and so on may be used as the user identifier.

The descriptions above have been given for an exemplarity situation in which a network includes one terminal 80, one communication apparatus 60, one data server 10, and one analysis server 30, but the network may include any number of terminals 80, communication apparatuses 60, data servers 10, and analysis servers 30. Even though there are a plurality of analysis servers 30, an access destination is reported from the terminal 80 to the communication apparatus 60 when the communication apparatus 60 attempts to access an analysis server 30, so that the communication apparatus 60 can specify the access destination. Even though there are a plurality of data servers 10, the communication apparatus 60 uses information such as a URL reported from the analysis server 30 when the communication apparatus 60 attempts to access a data server 10, so that the communication apparatus 60 can specify a data server 10 that is an access destination. Even in a network that includes a plurality of data servers 10 and a plurality of analysis servers 30, the communication apparatus 60 may use the ID management table 71 so as to specify an account and a password which are both used for accessing. In addition, when a plurality of terminals 80 are present, individual users may be distinguished by using, for example, first to third session IDs or access identifiers, thereby allowing the data server 10, the analysis server 30, and the communication apparatus 60 to process requests from a plurality of users in parallel. Similarly, in the second embodiment, a network may include any number of terminals 80, communication apparatuses 60, data servers 10, and analysis servers 90.

The tables used in the descriptions above are examples, so information elements included in the tables may be changed in accordance with an implementation. For simplicity of description, a situation was described in which the communication apparatus 60, the data server 30, and the analysis server 30 are each one server, but this situation is also an example. For example, the design may be changed to achieve operations of the communication apparatus 60 using a plurality of arbitrary communication apparatuses. Similarly, processes that would be performed by the data server 10 and the analysis server 30 may be achieved by a plurality of communication apparatuses.

The aforementioned embodiments make more confidential the information related to the referencing of an analysis result by a user.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system comprising:
a data server;
an analysis server; and
a communication apparatus configured to communicate with the data server and the analysis server, wherein
the data server stores, in association with each other, data obtained by the data server and user identification information that identifies a user, and transmits to the analysis server the data and first identification information associated with the user identification information,
the analysis server analyzes the data obtained from the data server and stores an analysis result in association with the first identification information,
the user identification information is concealed from the analysis server,
the first identification information is concealed from the communication apparatus,
the communication apparatus receives the user identification information and an analysis-result obtainment request from a client,
the communication apparatus transmits the analysis-result obtainment request to the analysis server without going through the data server,
upon receipt of the analysis-result obtainment request, the analysis server generates and transmits, to the communication apparatus, second identification information associated with the analysis-result obtainment request without going through the data server,
upon receipt of the second identification information, the communication apparatus transmits the second identification information and the user identification information to the data server,
upon receipt of the second identification information and the user identification information, the data server transmits the second identification information and the first identification information associated with the user identification information to the analysis server,
upon receipt of the first identification information and the second identification information, the analysis server transmits the analysis result and the second identification information to the communication apparatus without going through the data server, and
upon receipt of the analysis result and the second identification information, the communication apparatus transmits the analysis result to the client.

2. The communication system according to claim 1, wherein
the communication apparatus associates the analysis-result obtainment request with a group identifier and transmits the analysis-result obtainment request to the analysis server, the group identifier being an identifier allocated to a group of users for whom data is held in the data server,
the second identification information is a request identifier that identifies the analysis-result obtainment request,
the communication apparatus transmits the request identifier and the user identification information to the data server, and
the data server transmits, to the analysis server, the first identification information associated with the user identification information and the request identifier.

3. The communication system according to claim 1, wherein
the communication apparatus associates the analysis-result obtainment request with the group identifier that is an identifier allocated to a group of users for whom data is held in the data server and transmits, to the analysis server, the analysis-result obtainment request associated with the group identifier,
the first identification information is concealed from the communication apparatus,
the second identification information includes information that makes a request for the data server to generate third identification information corresponding to the first identification information associated with the analysis result for which the analysis-result obtainment request has been made,
the communication apparatus transmits, to the data server, the second identification information and the user identification information,
the data server generates and reports, to the communication apparatus, the third identification information associated with the first identification information,
the communication apparatus reports the third identification information to the analysis server, and
the analysis server obtains the first identification information associated with the third identification information from the data server.

4. The communication system according to claim 2, wherein
when the communication system includes a first data server that holds data on a user belonging to a first group that uses a first group identifier and a second data server that holds data on a user belonging to a second group that uses a second group identifier, the analysis server stores association information, the association information associating the first group identifier with first server information that identifies the first data server and associating the second group identifier with second server information that identifies the second data server, upon receipt of an analysis-result obtainment request associated with the first group identifier from the communication apparatus, the analysis server specifies the first server information using the association information, the analysis server transmits the second identification information and the first server information to the communication apparatus, and the communication apparatus reports the second identification information and the user identification information to the first data server.

5. The communication system according to claim 1, further comprising:

a terminal configured to make a request for the communication apparatus to obtain the analysis result, wherein upon receipt of a request from the terminal to obtain the analysis result, the communication apparatus transmits the analysis-result obtainment request to the analysis server using a group identifier allocated to a group of users for whom data is held by the data server, and upon receipt of the analysis result from the analysis server, the communication apparatus transmits the received analysis result to the terminal.

6. A communication method used by a system including a data server, an analysis server, and a communication apparatus that communicates with the data server and the analysis server, the communication method comprising:

associating, by the data server, obtained data with user identification information that identifies a user;

transmitting, by the data server, the data and first identification information associated with the user identification information to the analysis server, the user identification information being concealed from the analysis server, the first identification information being concealed from the communication apparatus;

analyzing, by the analysis server, the obtained data;

storing, by the analysis server, an analysis result in association with the first identification information;

receiving, by the communication apparatus, the user identification information and an analysis-result obtainment request from a client;

transmitting, by the communication apparatus, the analysis-result obtainment request to the analysis server without going through the data server;

upon receipt of the analysis-result obtainment request, generating, by the analysis server, second identification information associated with the analysis-result obtainment request;

transmitting, by the analysis server, the second identification information to the communication apparatus without going through the data server;

upon receipt of the second identification information, transmitting, by the communication apparatus, the second identification information and the user identification information to the data server;

upon receipt of the second identification information and the user identification information, transmitting, by the data server, the first identification information associated with the user identification information and the second identification information to the analysis server;

upon receipt of the first identification information and the second identification information, transmitting, by the analysis server, the analysis result and the second identification information to the communication apparatus without going through the data server; and upon receipt of the analysis result and the second identification information, transmitting, by the communication apparatus, the analysis result to the client.

7. A non-transitory computer-readable recording medium having stored therein a program for causing a computer to execute a process comprising:

receiving, from a data server that holds data on a user, the data and first identification information associated with the data;

generating an analysis result by analyzing the data;

storing the analysis result in association with the first identification information;

upon receipt of an analysis-result obtainment request that requests the analysis result, generating second identification information associated with the analysis-result obtainment request;

transmitting the second identification information to a source of the analysis-result obtainment request without going through the data server, the first identification information being concealed from the source;

after the data server receives from the source the second identification information and information that identifies the user who has requested the analysis result, receiving the first identification information from the data server, the information that identifies the user being concealed from the computer; and upon receipt of the first identification information, transmitting the analysis result to the source without going through the data server.

* * * * *